(12) United States Patent
Hagai

(10) Patent No.: US 7,433,083 B2
(45) Date of Patent: Oct. 7, 2008

(54) HALFTONE-IMAGE PROCESSING DEVICE

(75) Inventor: Naoki Hagai, Komaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 815 days.

(21) Appl. No.: 10/854,198

(22) Filed: May 27, 2004

(65) Prior Publication Data

US 2005/0179949 A1    Aug. 18, 2005

(30) Foreign Application Priority Data

Jun. 4, 2003    (JP) .............................. 2003-159858

(51) Int. Cl.
*H04N 1/405*    (2006.01)
(52) U.S. Cl. ..................... 358/3.06; 358/3.22
(58) Field of Classification Search .................. 358/1.9, 358/2.1, 3.06, 3.03, 3.14, 3.19, 3.21–3.24
See application file for complete search history.

(56) References Cited

U.S. PATENT DOCUMENTS

| 5,031,050 | A |   | 7/1991 | Chan |
| 5,278,670 | A | * | 1/1994 | Eschbach .................... 358/453 |
| 6,476,824 | B1 | * | 11/2002 | Suzuki et al. ............... 345/690 |
| 2003/0185455 | A1 | * | 10/2003 | Goertzen .................... 382/240 |

FOREIGN PATENT DOCUMENTS

| EP | 0836317 A2 | 4/1998 |
| JP | A 5-63966 | 3/1993 |
| JP | B2 2745527 | 2/1998 |
| JP | A-10-145592 | 5/1998 |
| JP | A-2000-032268 | 1/2000 |
| JP | A-2000-152003 | 5/2000 |
| JP | A-2000-196887 | 7/2000 |
| JP | A-2002-262089 | 9/2002 |
| JP | A-2003-069819 | 3/2003 |

* cited by examiner

*Primary Examiner*—Thomas D Lee
*Assistant Examiner*—Stephen M Brinich
(74) *Attorney, Agent, or Firm*—Oliff & Berridge, PLC

(57) ABSTRACT

A halftone-image processing device divides all the pixels for input image data into a plurality of 2×2 recording matrices and performs a process on each of the recording matrices. The halftone-image processing device stores a threshold table indicative of a one-to-one correspondence between a plurality of threshold values and a plurality of output dot combinations of large, medium, and small output dots. The halftone-image processing device calculates the sum of density values for all the pixels in a recording matrix, compares the sum of density values to the threshold values in the threshold table, and determines an output dot combination for the subject recording matrix based on the compared results. The halftone-image processing device sets the placement of output dots for pixels of the recording matrix based on: the determined output dot combination, the magnitude of the density values for the pixels in the recording matrix, and, when more than one pixel in the recording matrix has the same density value, a random number.

25 Claims, 16 Drawing Sheets

THRESHOLD TABLE "1"

| THRESHOLDS | DOT COMBINATIONS | SORT NUMBERS |
|---|---|---|
| Thre[1][1] | Outlevel [1][1]<br>=(0, 0, 0, 0) | 0 |
| Thre[2][1] | Outlevel [2][1]<br>=(0, 0, 0, small) | 1 |
| ... | ... | ... |
| Thre[10][1] | Outlevel [10][1]<br>=(0, small, small, medium) | -1 |
| ... | ... | ... |
| Thre[20][1] | Outlevel [20][1]<br>=(large, large, large, large) | 0 |

TH "m"

THRESHOLD TABLE "m"

| THRESHOLDS | DOT COMBINATIONS | SORT NUMBERS |
|---|---|---|
| Thre[1][m] | Outlevel [1][m]<br>=(0, 0, 0, 0) | 0 |
| Thre[2][m] | Outlevel [2][m]<br>=(0, 0, 0, small) | 1 |
| Thre[3][m] | Outlevel [3][m]<br>=(0, 0, small, small) | 2 |
| ... | ... | ... |
| Thre[10][m] | Outlevel [10][m]<br>=(0, small, medium, medium) | -1 |
| ... | ... | ... |
| Thre[n][m] | Outlevel [n][m]<br>=(large, large, large, large) | 0 |

FIG.12

RECORDING MATRIX →

| 0 | 1 |
|---|---|
| 2 | 3 |

FIG.15

PRINT MEDIA

RESOLUTIONS

|  | NORMAL PAPER | INKJET PAPER | GLOSS PAPER |
|---|---|---|---|
| 600 × 600 dpi | 1 | 3 | 4 |
| 1200 × 1200 dpi | 1 | 1 | 3 |

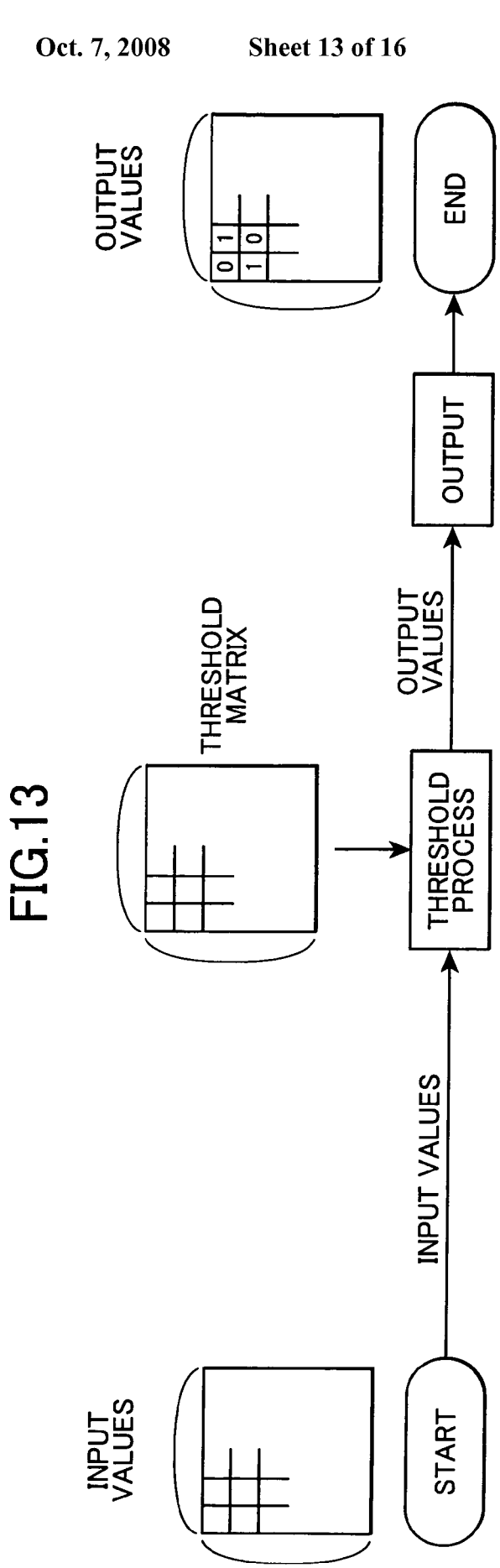

HALFTONE-IMAGE PROCESSING DEVICE

BACKGROUND OF THE INVENTION

1. Field of the Invention

The present invention relates to a halftone-image processing device for generating output image data by determining pixels for forming output dots based on input image data, the input image data having density data for a plurality of pixels.

2. Description of Related Art

A halftone processing method is a method for expressing gradations of inputted image data through dot distribution. Here, the inputted image data includes density data for a plurality of pixels. The error diffusion process and the dither process are representative examples of the halftone processing method.

Errors are generated at pixels when the inputted image data at the pixels is binarized to determine whether or not to output dots based on the density values of the pixels. According to the error diffusion method, the errors are distributed to other pixels that are located adjacent to the subject pixel and that are not yet processed. It is possible to reduce the difference in density between the inputted image data and the outputted image data for the overall image. Error diffusion is currently the most frequently used process and is used for reproducing high-quality images.

The error diffusion method, however, requires much more processing time than the dither method. Accordingly, various efforts have been made to speed up the error diffusion process. Japanese Patent No. 2745527 and U.S. Pat. No. 5,031,050 have proposed combining the dither method and the error diffusion method.

SUMMARY OF THE INVENTION

FIG. 1 shows a conceivable error diffusion method. As shown in FIG. 1, when an input value specifying the density of a pixel targeted for processing is inputted, errors, which have been generated at nearby pixels that are located adjacent to the subject pixel and that has already been processed, are collected into a correction amount by using a distribution matrix (P7). A corrected value is calculated by adding the input value and the collected errors (P1).

Next, the corrected value is compared to a preset threshold value, and an output value is determined based on the compared result (P2). The output value is outputted (P3). More specifically, when the corrected value is greater than or equal to the threshold value, an output value (1, for example) indicative of outputting a dot is generated. When the corrected value is less than the threshold value, an output value (0, for example) indicative of outputting no dot is generated.

A relative density value associated with the output value is read out and set (P4). Then, an error is calculated between the relative density value and the corrected value (P5). The error is stored in a buffer (P6).

The error in the buffer will be distributed to not-yet-processed neighboring pixels according to the distribution matrix (P7).

By distributing the error to neighboring pixels in this way, the overall density level is reproduced accurately.

However, since the process to distribute the error to neighboring pixels is performed for each pixel, the number of calculations is large. Hence, this process requires much processing time. In order to speed up the error diffusion process, it is conceivable to perform a halftone-image processing by executing the error diffusion process collectively on a group of several pixels that are located adjacent to one another.

This conceivable halftone-image processing method, designed to improve the computational speed, will be described with reference to FIG. 2.

Input image data is divided into matrices, each matrix being made up of X×Y pixels, and a process is performed for each matrix.

First, a group of input values specifying the densities of the X×Y pixels in the matrix to be processed is inputted. Errors generated in neighboring matrices that are located adjacent to the subject matrix and that have already been processed, are collected into a correction amount based on a distribution matrix (P17), and a group of corrected values is calculated by adding the group of input values and the correction amount (P11).

Next, a group of output values is generated by comparing the corrected values in the corrected value group to a group of threshold values stored in a predetermined threshold matrix (P12), and the group of output values are outputted (P13). More specifically, the threshold matrix has X×Y number of threshold values. The corrected value for each pixel in the subject matrix is compared to the corresponding threshold value in the threshold matrix. If the corrected value is greater than or equal to the threshold value, then an output value (1, for example) indicative of output of a dot is generated. If the corrected value is less than the threshold value, then an output value (0, for example) indicative of output of no dot is generated.

A relative density value associated with the group of output values is read and set (P14). An error is calculated as a difference between the relative density value and a group of the corrected values (P15), and is stored in a buffer (P16). The error in the buffer will be distributed to not-yet processed neighboring matrices based on the distribution matrix (P17).

This conceivable method can increase processing speed since an X×Y group of pixels is processed simultaneously. However, the method uses a single threshold matrix. If the input image includes a continuous region with very little change in color tone, the matrices of output values in that part will incorporate the values in the threshold matrix and continuously form the same pattern, thereby generating a cyclic pattern in the image.

In view of the foregoing, it is an object of the present invention to provide a halftone-image processing device that is capable of preventing the generation of such cyclic patterns.

In order to attain the above and other objects, the present invention provides a halftone-image processing device, including: an input portion; a representative density calculating portion; a storage portion; a comparing portion; and a dot-forming pixel determining portion. The input portion receives input image data for a plurality of pixels, the input image data including data indicative of a density value for each pixel, the plurality of pixels being grouped into a plurality of recording matrices, each recording matrix being formed of a prescribed number of pixels which are located adjacent to one another. The representative density calculating portion calculates, based on the density values for the pixels located in one recording matrix, a representative density value that represents the densities of the pixels located in the subject recording matrix. The storage portion stores a threshold table indicating a correspondence between a threshold value and an output dot number. The comparing portion compares the representative density value calculated for the subject recording matrix to the threshold value in the threshold table, and determines an output dot number for the representative density value based on the compared result. The dot-forming pixel determining portion uses a random number to determine, based on the determined output dot number, pixels for which output dots are to be outputted among the pixels in the subject recording matrix to configure a half-tone output image, thereby generating output image data.

According to another aspect, the present invention provides a halftone-image processing device, including: an input portion; a representative density calculating portion; a storage portion; a comparing portion; and a dot-forming pixel determining portion. The input portion receives input image data for a plurality of pixels, the input image data including data indicative of a density value for each pixel, the plurality of pixels being grouped into a plurality of recording matrices, each recording matrix being formed of a prescribed number of pixels which are located adjacent to one another. The representative density calculating portion calculates, based on the density values for the pixels located in one recording matrix, a representative density value that represents the densities of the pixels located in the subject recording matrix. The storage portion stores a threshold table indicating a correspondence between a threshold value and an output dot number. The comparing portion compares the representative density value calculated for the subject recording matrix to the threshold value in the threshold table, and determines an output dot number for the representative density value based on the compared result. The dot-forming pixel determining portion selectively uses a random number to determine, based on the determined output dot number, pixels for which output dots are to be outputted among the pixels in the subject recording matrix to configure a half-tone output image, thereby generating output image data.

According to another aspect, the present invention provides a halftone-image processing device, including: input means; representative density calculating means; a storage portion; comparing means; and dot-forming pixel determining means. The input means receives input image data for a plurality of pixels, the input image data including data indicative of a density value for each pixel, the plurality of pixels being grouped into a plurality of recording matrices, each recording matrix being formed of a prescribed number of pixels which are located adjacent to one another. The representative density calculating means calculates, based on the density values for the pixels located in one recording matrix, a representative density value that represents the densities of the pixels located in the subject recording matrix. The storage portion stores a threshold table indicating a correspondence between a threshold value and an output dot number. The comparing means compares the representative density value calculated for the subject recording matrix to the threshold value in the threshold table, and determines an output dot number for the representative density value based on the compared result. The dot-forming pixel determining means uses a random number to determine, based on the determined output dot number, pixels for which output dots are to be outputted among the pixels in the subject recording matrix to configure a half-tone output image, thereby generating output image data.

According to another aspect, the present invention provides a halftone-image processing method, including the steps of: receiving input image data for a plurality of pixels, the input image data including data indicative of a density value for each pixel, the plurality of pixels being grouped into a plurality of recording matrices, each recording matrix being formed of a prescribed number of pixels which are located adjacent to one another; calculating, based on the density values for the pixels located in one recording matrix, a representative density value that represents the densities of the pixels located in the subject recording matrix; comparing the representative density value calculated for the subject recording matrix to a threshold value in a threshold table, which indicates a correspondence between the threshold value and an output dot number, and determining an output dot number for the representative density value based on the compared result; and using a random number to determine, based on the determined output dot number, pixels for which output dots are to be outputted among the pixels in the subject recording matrix to configure a half-tone output image, thereby generating output image data.

According to another aspect, the present invention provides a storage medium storing a halftone-image processing program readable by a computer. The halftone-image processing program includes: a program of receiving input image data for a plurality of pixels, the input image data including data indicative of a density value for each pixel, the plurality of pixels being grouped into a plurality of recording matrices, each recording matrix being formed of a prescribed number of pixels which are located adjacent to one another; a program of calculating, based on the density values for the pixels located in one recording matrix, a representative density value that represents the densities of the pixels located in the subject recording matrix; a program of comparing the representative density value calculated for the subject recording matrix to a threshold value in a threshold table, which indicates a correspondence between the threshold value and an output dot number, and determining an output dot number for the representative density value based on the compared result; and a program of using a random number to determine, based on the determined output dot number, pixels for which output dots are to be outputted among the pixels in the subject recording matrix to configure a half-tone output image, thereby generating output image data.

BRIEF DESCRIPTION OF THE DRAWINGS

The above and other objects, features and advantages of the invention will become more apparent from reading the following description of the preferred embodiments taken in connection with the accompanying drawings in which:

FIG. 11 is an explanatory diagram showing a plurality of threshold tables stored in the halftone-image processing device of FIG. 3;

FIG. 12 is an explanatory diagram illustrating how to assign numbers in pixels in a recording matrix according to a sorting procedure of the first embodiment;

FIG. 13 is an explanatory diagram showing a dither process in FIG. 6;

FIG. 15 is an explanatory diagram showing the structure of a selection table;

DETAILED DESCRIPTION OF THE PREFERRED EMBODIMENTS

Figure 1:
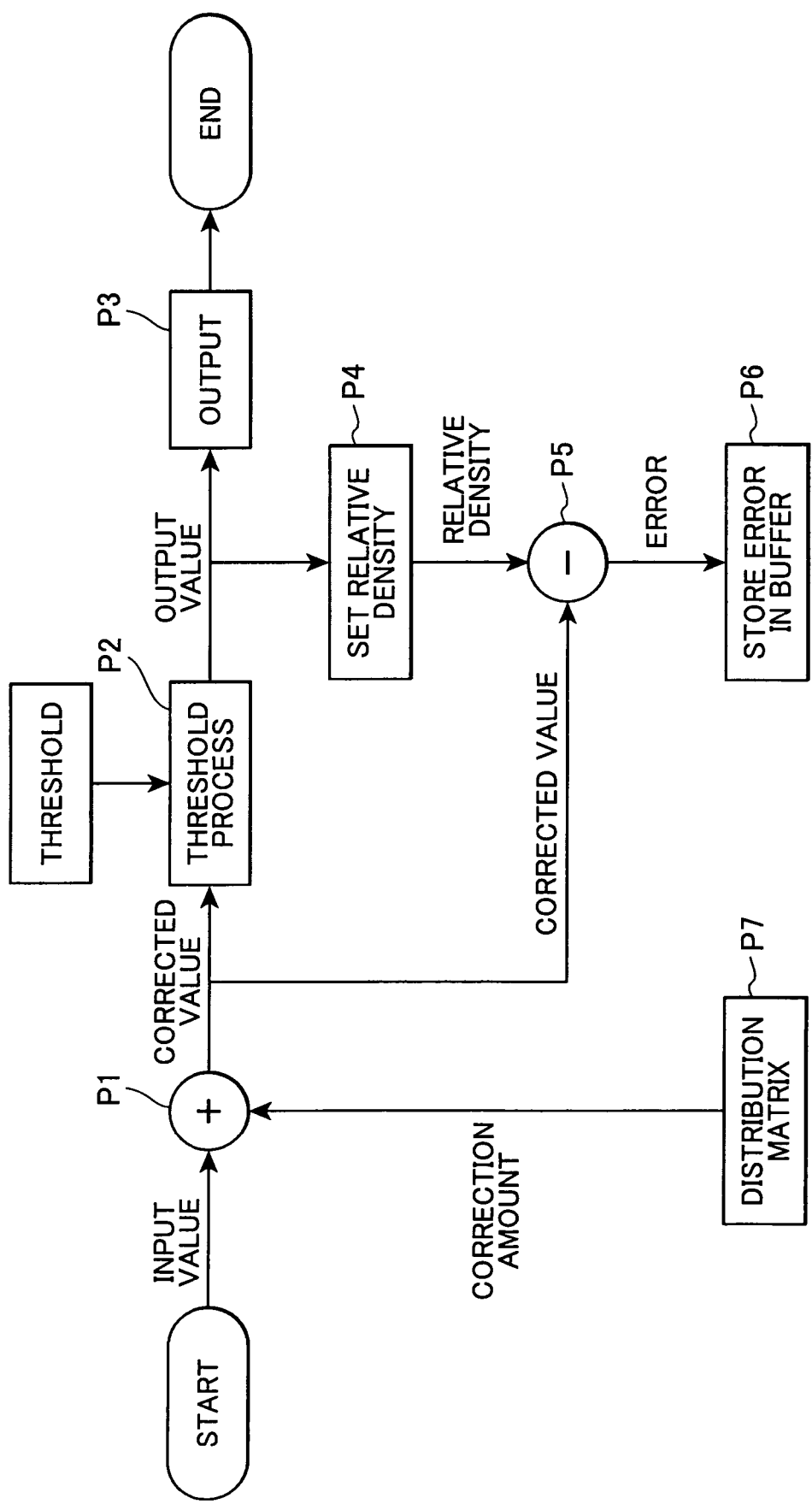
FIG. 1 is an explanatory diagram showing a conceivable error-diffusion process.
Figure 2:
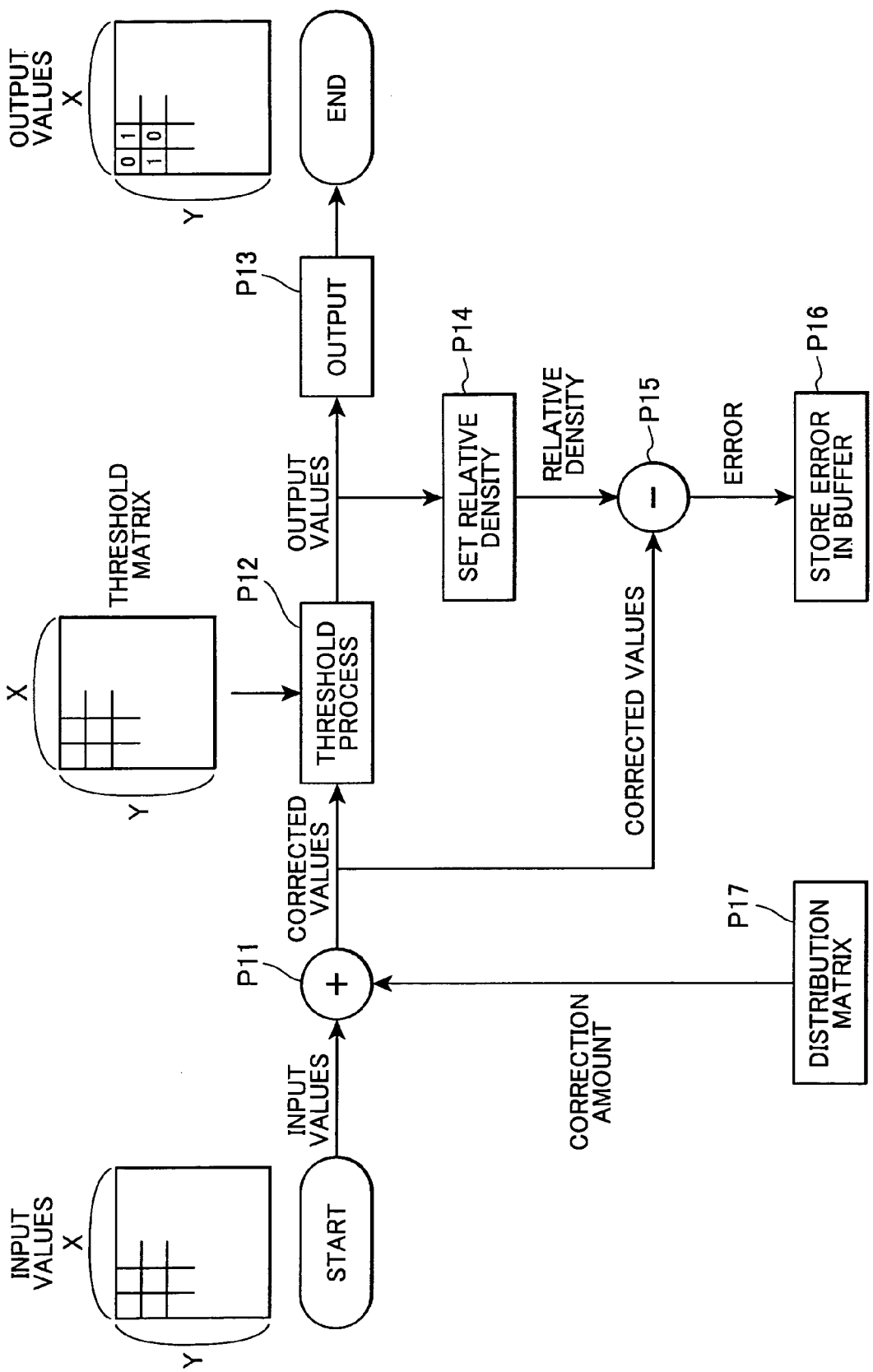
FIG. 2 is an explanatory diagram showing another conceivable halftone image process.

A half-tone image processing device according to preferred embodiments of the present invention will be described while referring to the accompanying drawings wherein like parts and components are designated by the same reference numerals to avoid duplicating description.

First Embodiment

A half-tone image processing device according to a first embodiment of the present invention will be described with reference to FIGS. 3-15. The half-tone image processing device is constructed from a personal computer.

First, the construction of the personal computer 100 will be described with reference to FIG. 3.

Figure 3:
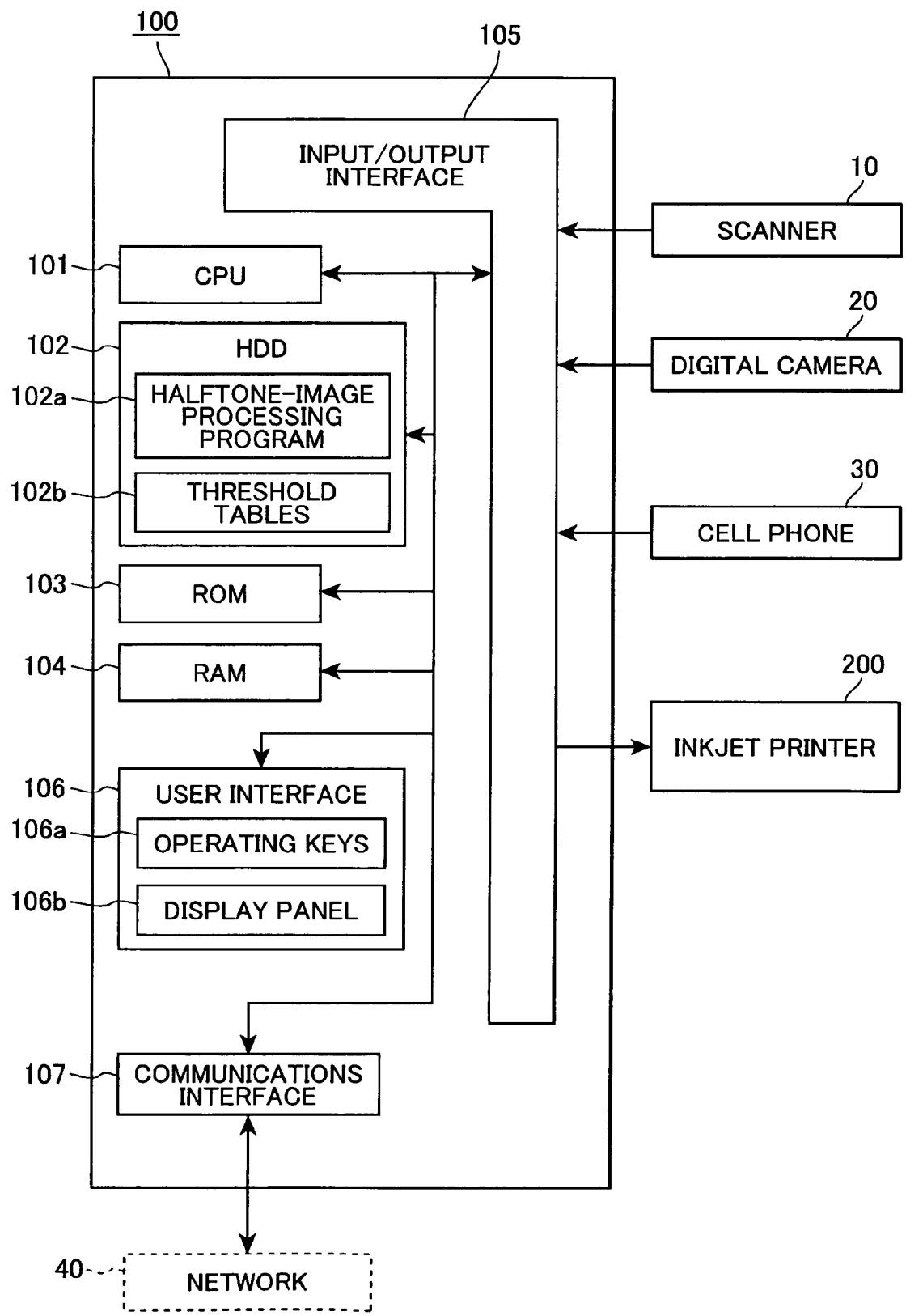
FIG. 3 is a block diagram showing the construction of a halftone-image processing device according to a first embodiment of the present invention.

As shown in FIG. 3, the personal computer 100 includes: a CPU 101, a hard disc drive 102, a ROM 103, a RAM 104, an input/output interface 105, a user interface 106, and a communication interface 107. The CPU 101 is for executing processes based on predetermined processing programs. The ROM 103 is prestored with various control programs. The RAM 104 is provided with various memory areas for storing data and the like inputted from external devices. The user interface 106 has: a plurality of operating keys 106a that can be operated by the user; and a display panel 106b for displaying various data.

A program storage area 102a and a threshold table storage area 102b are allocated in the hard disk drive 102. The program storage area 102a stores therein a halftone-image processing program (FIGS. 5-10 and FIG. 14) that enables the CPU 101 to execute a halftone image process. The threshold table storage area 203b stores therein a plurality of threshold tables TH (FIG. 11) used in the halftone image process.

It is noted that a selection table ST (FIG. 15) is stored in another remaining storage area allocated in the hard disk drive 102.

The input/output interface 105 is interconnected with the components 101, 102, 103, 104, 106, and 107, as well as a scanner 10, a digital camera 20, and a cell phone 30. The scanner 10, digital camera 20, and cell phone 30 input image data including color data into the personal computer 100. The input/output interface 105 is also connected to an inkjet printer 200. Image data is outputted to the inkjet printer 200 after undergoing the halftone-image process executed by the personal computer 100.

The user interface 106 outputs a print start command to the CPU 101 when the user performs an operation on the operating keys 106a indicating his/her desire to start printing. The user interface 106 outputs a user selection command to the CPU 101 when the user performs an operation on the operating keys 106a indicating his/her desire to select or create his/her desired threshold table TH. The user interface 106 outputs a registered table selection command to the CPU 101 when the user performs an operation on the operating keys 106a indicating his/her desire to select his/her desired threshold table TH among the threshold tables TH in the storage area 102b.

The communication interface 107 is also connected to a network 40. Image data is inputted into the personal computer 100 via the network 40.

In the personal computer 100 having this construction, the CPU 101 receives image data inputted from the scanner 10, the digital camera 20, the cell phone 30, or the network 40 according to a prescribed processing program and stores this image data on the hard disc drive 102, for example. When the user interface 106 inputs a print start command into the CPU 101, the CPU 101 reads the image data from the hard disc drive 102 and stores the image data in the RAM 104. Subsequently, the CPU 101 reads the image data from the RAM 104 and performs the halftone-image process based on the halftone-image processing program stored in the program storage area 102a. After completing the halftone-image process, the CPU 101 outputs the image data (output image data) to the inkjet printer 200 via the input/output interface 105.

It is noted that the halftone-image processing program is originally recorded in a recording medium such as a flexible disk, a CD-ROM, or the like, is read from the recording medium, and is stored in the program storage area 102a in the hard disk drive 102. Instead, the halftone-image processing program may be downloaded to the hard disk drive 102 from the communication network 40.

Similarly, the threshold tables TH are originally recorded in a recording medium such as a flexible disk, a CD-ROM, or the like, is read from the recording medium, and is stored in the threshold table storage area 102b in the hard disk drive 102. Instead, the threshold tables TH may be downloaded to the hard disk drive 102 from the communication network 40.

Next, the halftone image process of the present embodiment will be described with reference to FIG. 4.

In the preferred embodiment, input image data is divided into recording matrices two pixels high by two pixels wide, and a process is performed on each recording matrix. The image process is performed repeatedly on the input image data, beginning from the left side of the first row of recording matrices and proceeding to the right along the X-axis. After completing the process on the rightmost recording matrix, the image process is repeated for the second row of recording matrices by shifting down two pixels worth.

Here, an example will be given in which a recording matrix M1 is the target matrix for image processing.

Pixel data making up the input image data includes density values within the range 0-255. As shown in FIG. 4, the pixels in the recording matrix M1 have density values 100, 200, 150, and 100 beginning from the top left.

(I) First, the density values for all pixels in the recording matrix M1 are added. A sum of 550 is obtained.

(II) Errors generated at recording matrices M2, M3, and M4, which are located adjacent to the recording matrix M1 and for which processing has already been completed, are collected by using a distribution matrix mtr(x, y) indicated in Table 1 below, and are added to the sum "550" for the recording matrix M1:

TABLE 1

| DISTRIBUTION MATRIX mtr (x, y) | |
|---|---|
| 1/5 | 2/5 |
| 2/5 | |

More specifically, ⅕ of the error generated at recording matrix M3, ⅖ of the error generated at recording matrix M4, and ⅖ of the error generated at recording matrix M2 are added to the sum "550" at recording matrix M1. In this example, the total of the ⅕ of the error generated at recording matrix M3, ⅖ of the error generated at recording matrix M4, and ⅖ of the error generated at recording matrix M2 is equal to 70. Accordingly, an error value "70" is added to the sum "550" at recording matrix M1 to obtain a corrected value "620" for recording matrix M1.

(III) This corrected value "620" is then compared to threshold values in a threshold table TH to determine a combination of output dots.

Figure 4:
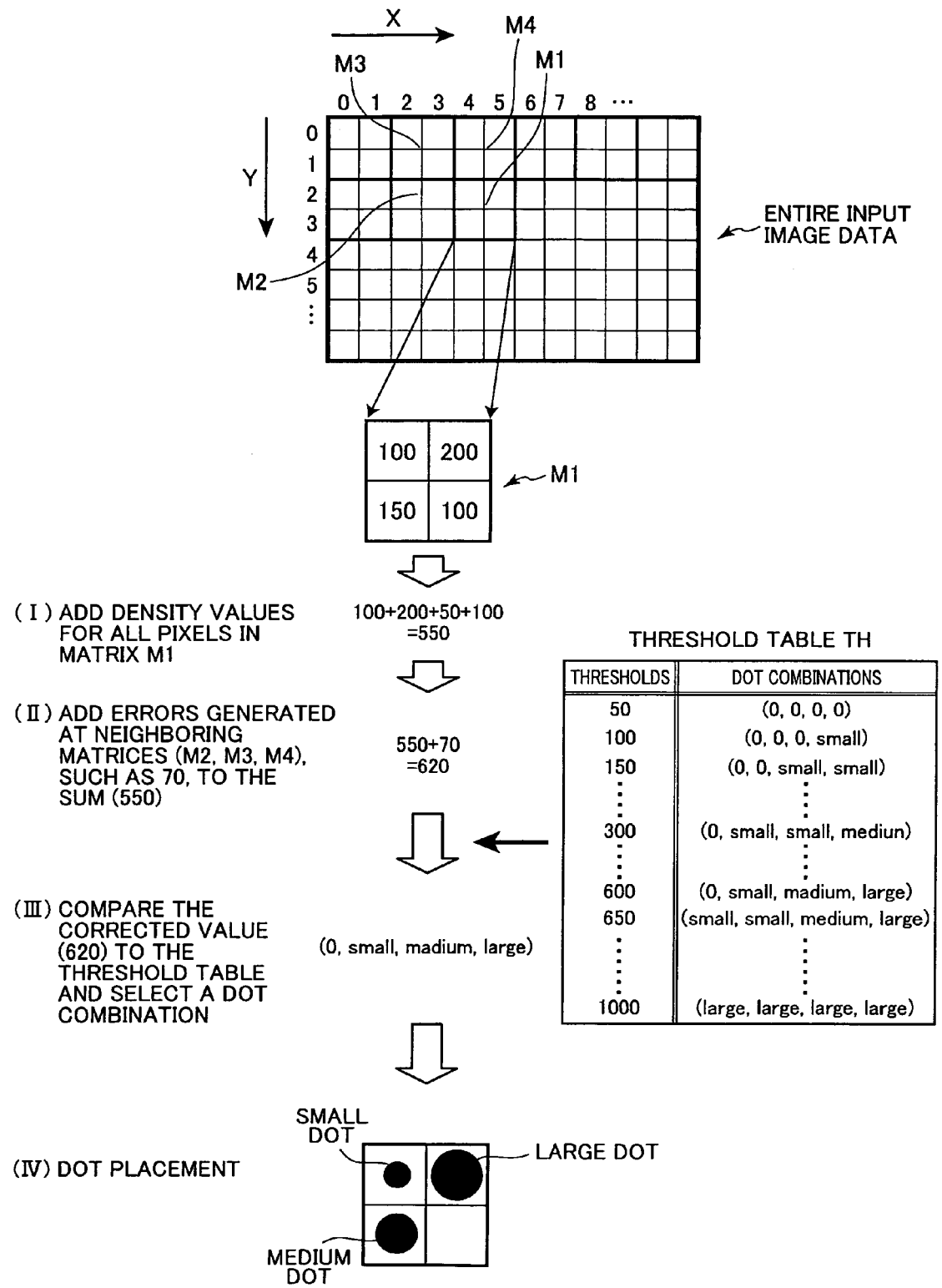
FIG. 4 is an explanatory diagram illustrating a halftone image process executed by the halftone-image processing device of FIG. 3.

As also shown in FIG. 4, the threshold table TH stores therein a one-to-one combination of a plurality of threshold values and a plurality of combinations of output dots. There are three types of output dots: large, medium, and small dots.

Since the corrected value is equal to 620 in this example, the combination (0, small, medium, large) corresponding to the threshold value 600 is selected from the threshold table TH.

(IV) The dots in the selected combination (0, small, medium, large) are then arranged in the recording matrix M1 according to the relationships among the density values of the pixels within the recording matrix M1. Hence, the large dot is positioned at the pixel having a density value of 200, which is the largest density value in the recording matrix M1. The medium dot is placed in the pixel having the second largest density value of 150.

Since the density values of the remaining two pixels are the same, a random number is used to choose the pixel at which the small dot is placed. In this example, the small dot is placed in the upper left pixel, and no dot is placed in the lower right pixel. Hence, the arrangement of dots in pixels is determined according to this procedure.

Next, a printing process executed by the CPU 101 of the personal computer 100 will be described with reference to FIG. 5.

Figure 5:
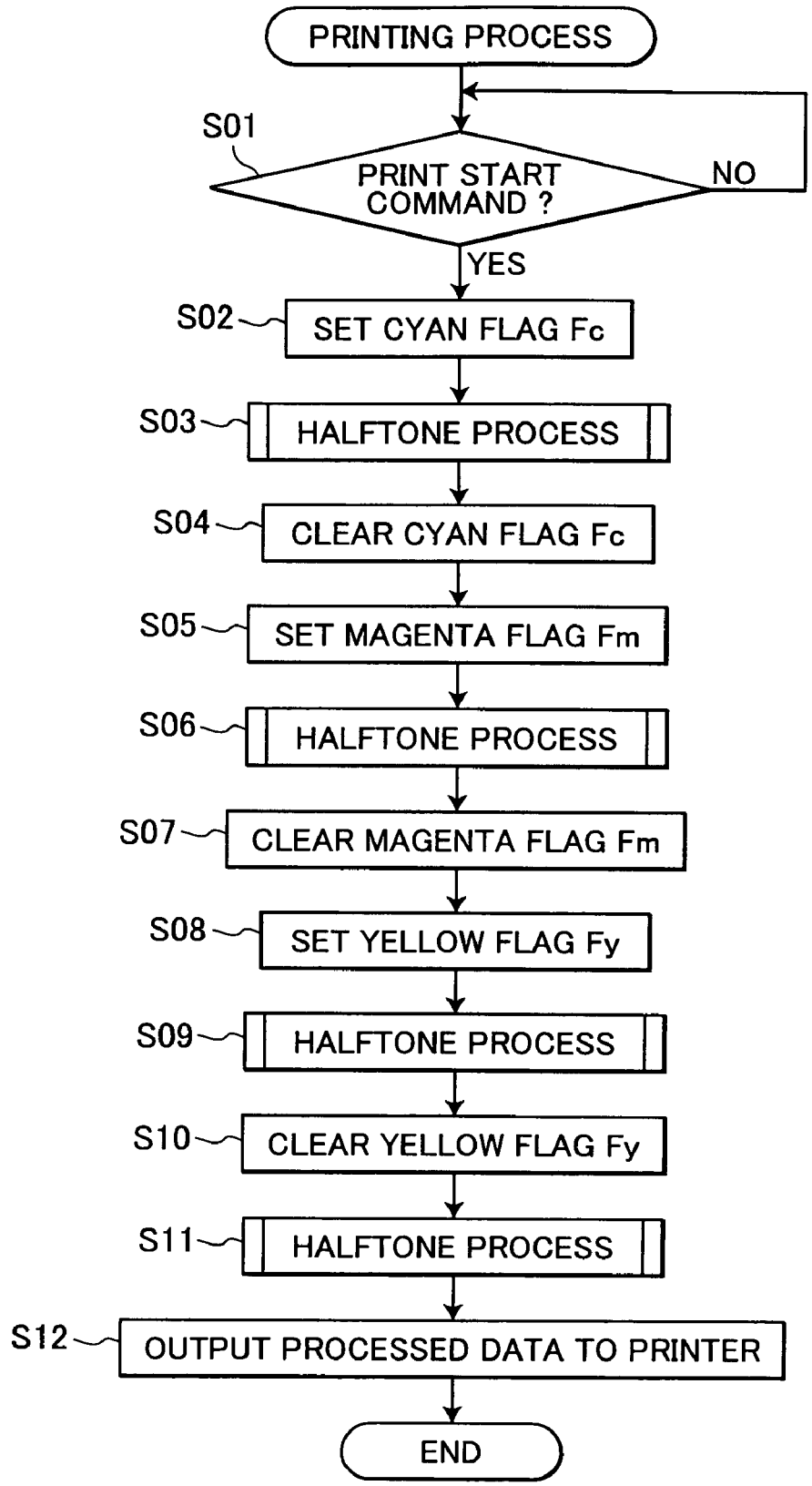
FIG. 5 is a flowchart showing steps in a printing process according to the first embodiment.

FIG. 5 is a flowchart showing steps in the printing process. This process is repeatedly executed while the personal computer 100 is operating (while the power is turned on).

At the beginning of the printing process, the CPU 101 determines in S01 whether a print start command has been inputted. If the CPU 101 determines that a print start command has been inputted (S01: YES), then the CPU 101 advances to S02. However, if the CPU 101 determines that a print start command has not yet been inputted (S01: NO), then the CPU 101 repeats the process of S01.

In S02 the CPU 101 sets a cyan flag Fc provided in the RAM 104 (Fc=1). In S03 the CPU 101 performs a halftone process described later. Here, the halftone process is performed on pixel data for the cyan color.

In S04 the CPU 101 clears the cyan flag Fc (Fc=0). In S05 the CPU 101 sets the magenta flag Fm provided in the RAM 104 (Fm=1). In S06 the CPU 101 performs the halftone process described later. Here, the halftone process is performed on pixel data for the color magenta.

After completing the halftone process of S06, the CPU 101 clears the magenta flat Fm in S07 (Fm=0). In S08 the CPU 101 sets a yellow flag Fy stored in the RAM 104 (Fy=1). In S09 the CPU 101 performs the halftone process described later on pixel data for the color yellow. In S10 the CPU 101 clears the yellow flag Fy (Fy=0). In S11 the CPU 101 performs the halftone process described later on pixel data for black.

In S12 the CPU 101 outputs the resulting data from the halftone processes to the inkjet printer 200 and ends the printing process.

Figure 6:
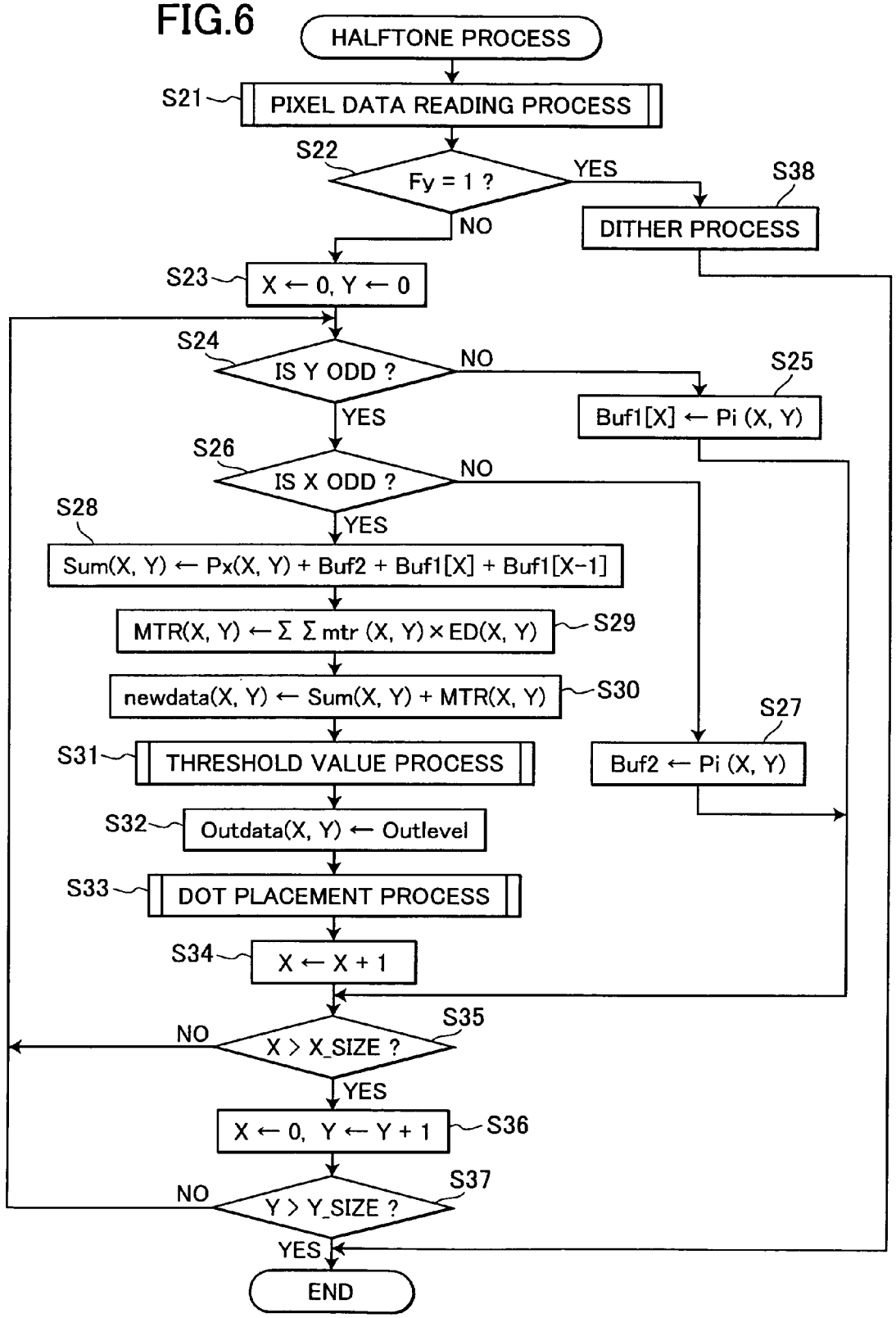
FIG. 6 is a flowchart showing steps in each halftone process in FIG. 5.

Next, the halftone process executed in S03, S06, S09, and S11 in FIG. 5 will be described with reference to FIG. 6. FIG. 6 is a flowchart showing steps in the halftone process.

At the beginning of the halftone process, the CPU 101 performs a process in S21 to read pixel data.

The image data inputted into the personal computer 100 includes data for X_SIZE in the horizontal direction and Y_SIZE in the vertical direction, wherein X_SIZE is the horizontal dimension in pixels of the input data and Y_SIZE is the vertical dimension in pixels of the input data. Hence, the input image data includes X_SIZE×Y_SIZE pixels of image data P(X,Y). Here, X is the horizontal coordinate of a pixel and includes 0, 1, 2, . . . , and X_SIZE and Y is the vertical coordinate of the pixel and includes 0, 1, 2, . . . , and Y_SIZE. Further, X_SIZE and Y_SIZE may differ according to the size of the image data.

Each image data P(X,Y) includes four color components defined by C (cyan), M (magenta), Y (yellow), and K (black). Each component has eight bits of data for indicating one of 256 gradations from 0 to 255, where 0 is normally the darkest level and 255 the brightest. Further, Pc(X,Y) denotes image data for cyan, Pm(X,Y) image data for magenta, Py(X,Y) image data for yellow, and Pk(X,Y) image data for black.

Figure 7:
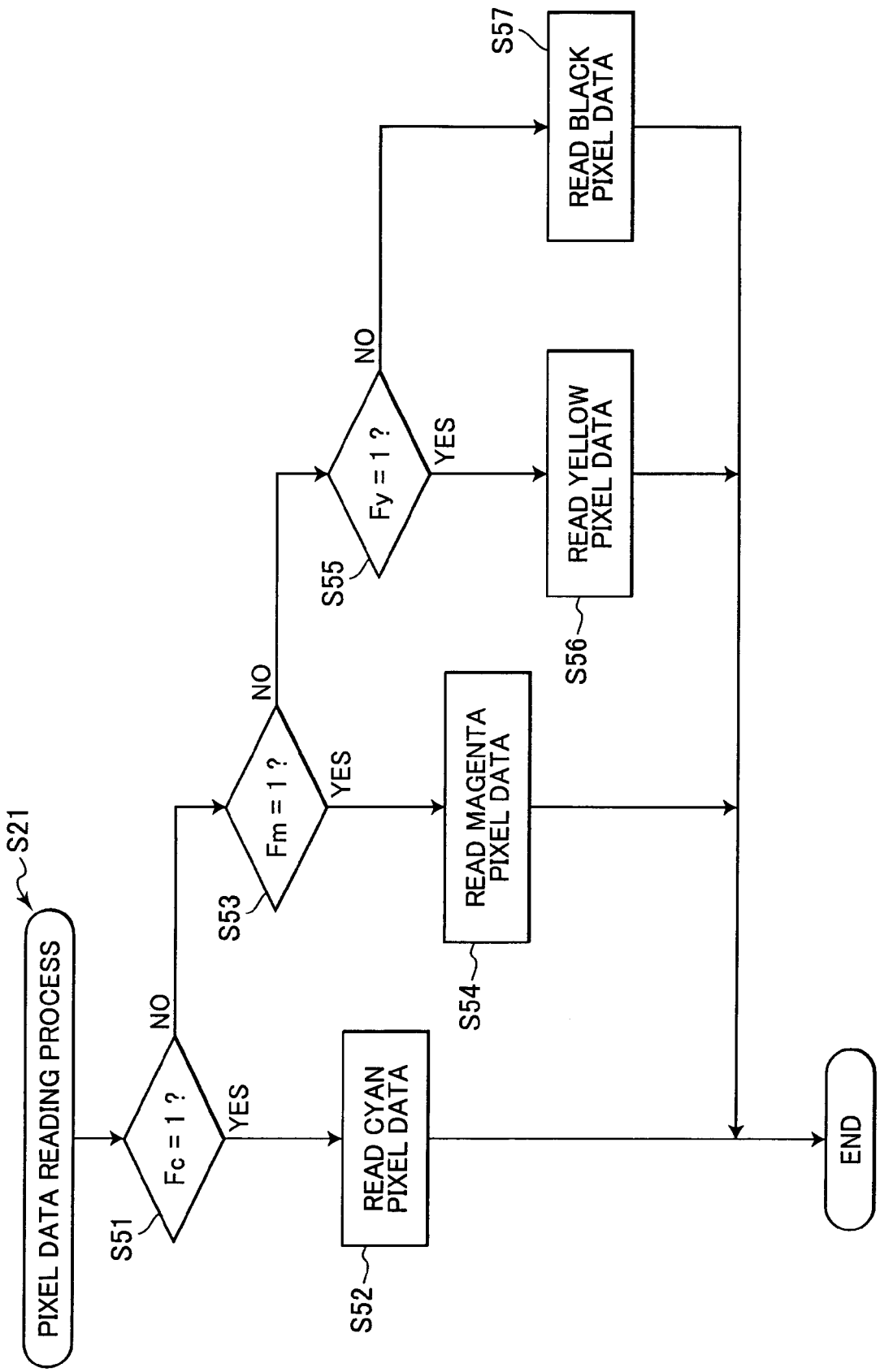
FIG. 7 is a flowchart showing steps in a pixel data reading process in FIG. 6.

The pixel data reading process is executed according to the steps shown in FIG. 7. At the beginning of this process, the CPU 101 determines in S51 whether the flag Fc has been set. If the CPU 101 determines that the flag Fc has been set (S51: YES), then in S52 the CPU 101 reads image data Pc(X,Y) for cyan in the entire (X,Y) coordinate system from the hard disc drive 102 and stores this data in the RAM 104. After storing the data, the CPU 101 ends the process to read pixel data.

On the other hand, if the flag Fc has not been set (S51: NO), then in S53 the CPU 101 determines whether the flag Fm has been set. If the CPU 101 determines that the flag Fm has been set (S53: YES), then in S54 the CPU 101 reads image data Pm(X,Y) for magenta in the entire (X,Y) coordinate system from the hard disc drive 102 and stores this data in the RAM 104. Subsequently, the CPU 101 ends the process to read pixel data.

On the other hand, if the CPU 101 determines that flag Fm has not been set (S53: NO), then in S55 the CPU 101 determines whether flag Fy has been set. If the flag Fy has been set (S55: YES), then in S56 the CPU 101 reads image data Py(X,Y) for yellow in the entire (X,Y) coordinate system from the hard disc drive 102 and stores this data in the RAM 104. Subsequently, the CPU 101 ends the process to read pixel data.

On the other hand, if the flag Fy has not been set (S55: NO), then in S57 the CPU 101 reads the image data Pk(X,Y) for black in the entire (X,Y) coordinate system and stores this data in the RAM 104. Subsequently, the CPU 101 ends the process to read pixel data.

Returning to the halftone process of FIG. 6, after the CPU 101 completes the process of S21, the CPU 101 determines in S22 whether the yellow flag Fy has been set. If the CPU 101 determines that the flag Fy has not been set (S22: NO), then in S23 the CPU 101 sets X and Y to 0 as initial coordinate values for the image data.

In S24 the CPU 101 determines whether Y is an odd number. If the CPU 101 determines that Y is odd (S24: YES), then the CPU 101 advances to S26. However, if Y is not odd (S24: NO), then in S25 the CPU 101 stores, in an input buffer Buf1(X), the image data Pi(X,Y) corresponding to the values X and Y where i indicates the color of the image data and is c, m, y, or k.

In S26 the CPU 101 determines whether X is an odd number. If the CPU 101 determines that X is odd (S26: YES), then the CPU 101 advances to S28. However, if the X is not odd (S26: NO), then in S27 the CPU 101 stores, in an input buffer Buf2, the image data Pi(X,Y) corresponding to the values of X and Y.

In S28 the CPU 101 adds values in the input buffers Buf2, Buf1(X), and Buf1(X−1) to the image data Px(X,Y) to obtain a sum "Sum(X,Y)". Hence, the image data at coordinates (X,Y), (X−1,Y), (X,Y−1), and (X−1,Y−1) are added together.

In S29 the CPU 101 collects errors ED(X,Y) generated in three neighboring recording matrices, that are located adjacent to the target recording matrix and that have already been processed, by using the distribution matrix mtr(X,Y) to obtain a correction amount MTR(X,Y). In this example, the correction amount MTR(X,Y) is set to the summation of products obtained by multiplying weighting factors with errors generated in the neighboring recording matrices, such as ⅖ from the adjacent recording matrix to the left of the target recording matrix, ⅖ from the adjacent recording matrix directly above, and ⅕ from the adjacent recording matrix diagonally above and to the left. For example, if the target recording matrix now being processed is the recording matrix M1 (shown in FIG. 4), the CPU 101 collects errors ED(X,Y) generated in the three neighboring recording matrices M2, M3, and M4 by using the distribution matrix mtr(X,Y) to obtain the correction amount MTR(X,Y).

In S30 the CPU 101 adds the correction amount MTR(X,Y) to the sum Sum(X,Y) to obtain the corrected value Newdata(X,Y).

In S31 the CPU 101 performs a threshold value process.

Figure 8:
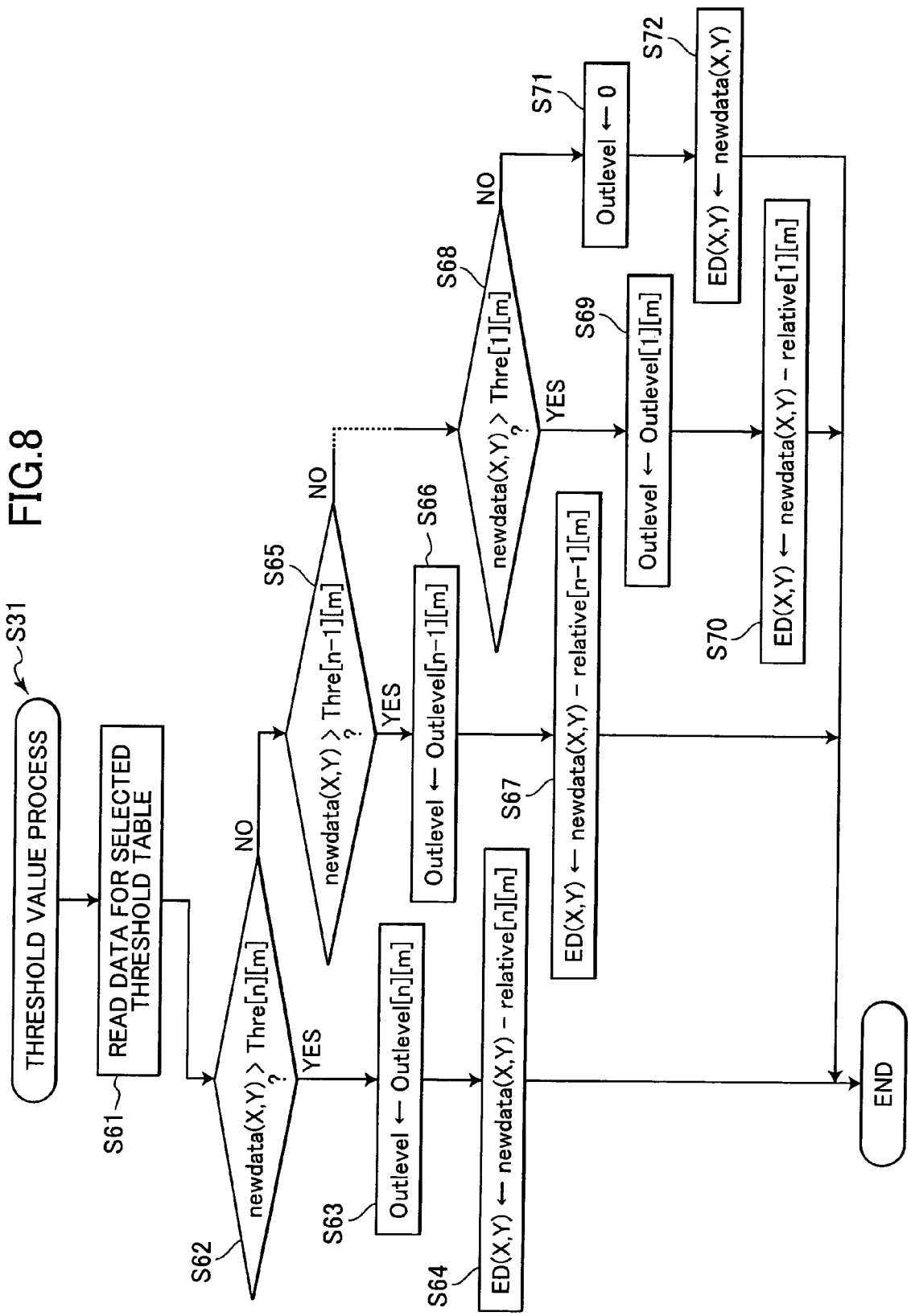
FIG. 8 is a flowchart showing steps in a threshold value process in FIG. 6.

The threshold value process is performed according to the steps shown in FIG. 8.

At the beginning of the threshold value process, in S61 the CPU 101 reads data for a threshold table TH, which has been selected or created during a threshold table selection process described below.

It is noted that as shown in FIG. 11, a plurality of threshold tables TH have been previously prepared and are stored in the storage area 102b of the hard disk drive 102. The threshold tables TH are assigned with table numbers.

Each threshold table TH lists up: a plurality of threshold values Thre[N][M], a plurality of output dot combinations Outlevel[N][M], and a plurality of sort numbers in one-to-one correspondence with one another. There are three types of output dots: large, medium, and small dots. Each threshold table TH lists up no output dot combination Outlevel (small, small, small, small) that includes small dots only.

During the threshold table selection process, one threshold table TH is selected among the plurality of threshold tables TH, or a user's desired threshold table TH is newly created.

Next, the threshold table selection process executed by the CPU 101 of the personal computer 100 will be described with reference to FIG. 14.

Figure 14:
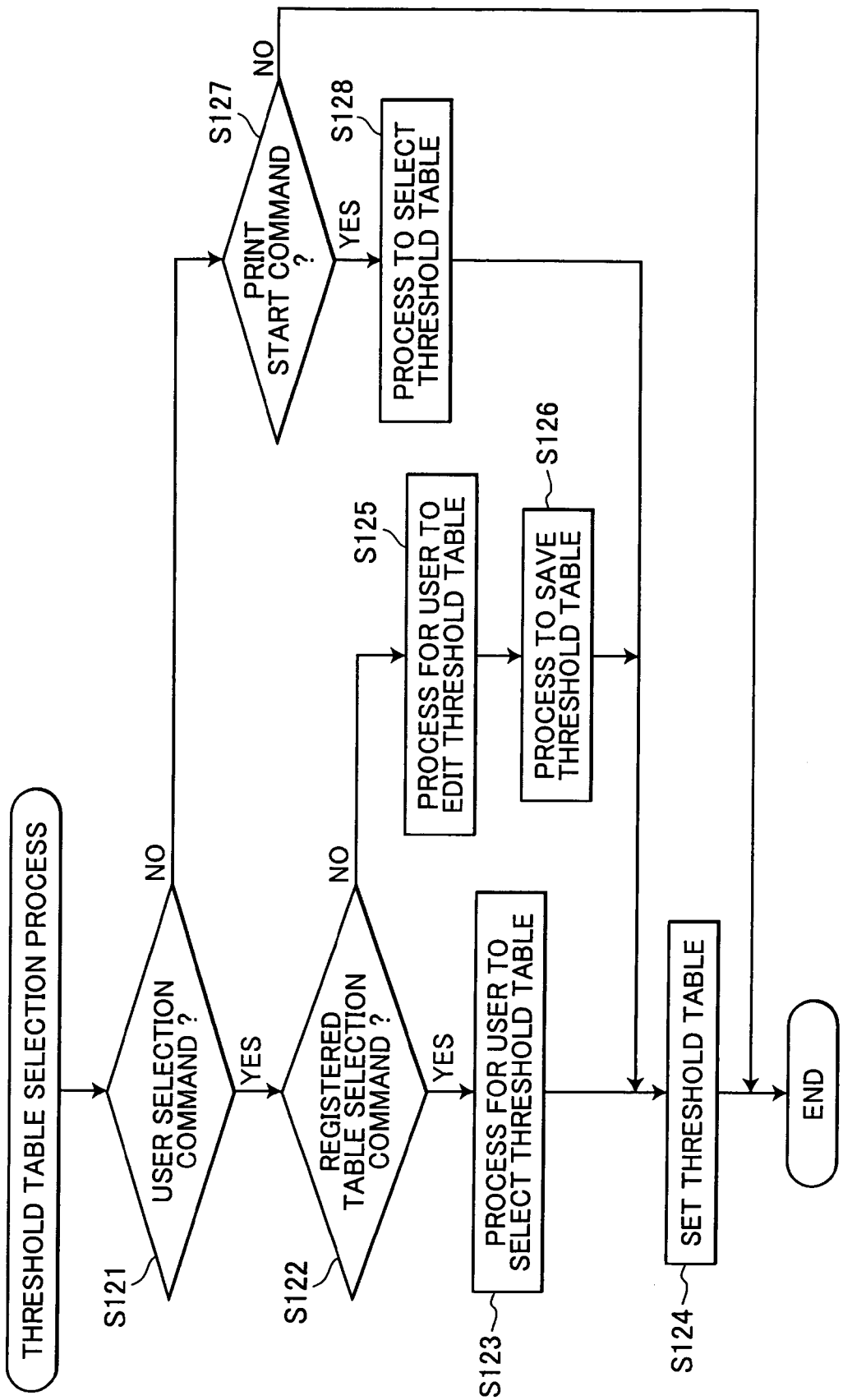
FIG. 14 is a flowchart showing steps in a threshold table selection process executed by the halftone-image processing device of FIG. 3.

FIG. 14 is a flowchart showing steps in the threshold table selection process. This process is executed repeatedly while the personal computer 100 is operating (while the power is turned on).

At the beginning of the threshold table selection process, the CPU 101 determines in S121 whether a user selection command has been inputted. The user selection command indicates the user's instruction to select or create the user's desired threshold table TH.

If the user operates the operating keys 106a to input the user selection command, the CPU 101 determines that a user selection command has been inputted (S121: YES).

Then, in S122 the CPU 101 determines whether a registered table selection command has been inputted. The registered table selection command indicates the user's instruction to select one threshold table TH among the threshold tables TH from the storage area 102b.

If the user operates the operating keys 106a to input a registered table selection command, the registered table selection command has been inputted (S122: YES). Then, the CPU 101 performs a process enabling the user to select a threshold table TH. Here, the user operates the operating keys 106a to select a threshold table TH from the tables stored on the hard disc drive 102. The user interface 106 outputs to the CPU 101 selection data indicative of the user's selected threshold table TH.

In S124 the CPU 101 sets, based on the selection data, the user's selected table as the threshold table TH to be used in the halftone process, and ends the threshold table selection process.

However, if the CPU 101 determines that a registered table selection command has not been inputted (S122: NO), then in S125 the CPU 101 performs a process enabling the user to edit a threshold table TH. Thus, the user inputs his/her desire to edit or create a new threshold table TH by not inputting the registered table selection command. The user operates the operating keys 106a to edit a new threshold table TH. More specifically, the user inputs at least one of a threshold value Thre[N][M] and an output dot combination Outlevel[N][M] desired to be stored in the new threshold table TH.

It is noted that in S125, the user may create a new threshold table TH by inputting his/her desired values for all the threshold values Thre[N][M] and all the output dot combinations Outlevel[N][M] that make up the threshold table TH. Alternatively, the user may create a new threshold table TH by simply amending one of the threshold tables TH already stored in the hard disk drive 102 by changing at least one of the threshold values and the output dot combinations in the subject threshold table TH.

In S126 the CPU 101 saves the thus newly-edited threshold table TH on the hard disc drive 102.

In S124 the CPU 101 sets the save threshold table TH as the threshold table to be used in the halftone process, and ends the threshold table selection process.

However, if the CPU 101 determines in S121 that a user selection command has not been inputted (S121: NO), then in S127 the CPU 101 determines whether a print start command has been inputted.

If the CPU 101 determines that a print start command has been inputted (S127: YES), then in S128 the CPU 101 performs a process to select a threshold table TH according to printing conditions, such as resolution and print media.

As shown in FIG. 15, the hard disc drive 102 is prestored with a selection table ST. The selection table ST contains the table numbers of the threshold tables TH to be selected according to printing conditions. More specifically, the selection table ST indicates one table number of a threshold table TH that should be used for a combination of a resolution and a type of print media. For example, the selection table ST indicates that a threshold table TH of table number "3" should be used for a combination of a resolution of "600×600 dpi" and an inkjet paper. The CPU 101 refers to the selection table ST, and selects one threshold table TH assigned to the table number that matches the present printing conditions.

In S124 the CPU 101 sets the threshold table TH selected in S128 as the threshold table to be used in the halftone process, and ends the threshold table selection process.

The description now returns to S61 in the threshold value process (FIG. 8). In S61, one threshold table TH that has been selected or newly edited in the threshold table selection process of FIG. 14 as described above is read in.

It is now assumed that a threshold table TH with table number "m" shown in FIG. 11 has been selected during the threshold table selection process.

In such a case, in S62 the CPU 101 determines whether the corrected value Newdata(X,Y) is greater than the threshold value Thre[n][m], which is the largest threshold value among all the "n" number of threshold values Thre[1][m] to Thre[n][m] in the selected threshold table TH "m".

If the CPU 101 determines that the Newdata(X,Y) is greater than the threshold value Thre[n][m] (S62: YES), then in S63 the CPU 101 stores the Outlevel[n][m] ((large, large, large, large)) in the output dot combination Outlevel.

In S64 the CPU 101 calculates the difference between the corrected value Newdata(X,Y) and a relative density value Relative[n][m] for the output dot combination Outlevel[n][m], stores the calculated difference in the error ED(X,Y), and ends the threshold value process.

It is noted that the Relative density value Relative[N][M] is determined for each output dot combination Outlevel[N][M]. It is also noted that relative density values of 255, 200, and 60 are set for large, medium, and small dots, respectively. Hence, the relative density value for an output dot combination (0, small, medium, large) for example, is determined as 515=0+ 60+200+255.

On the other hand, if the CPU 101 determines in S62 that the value Newdata(X,Y) is not greater than Thre[n][m] (S62: NO), then in S65 the CPU 101 determines whether the value Newdata(X,Y) is greater than the threshold value Thre[n-1][m], which is the second largest among all the threshold values Thre[1][m] to Thre[n][m] in the threshold table TH "m".

If the Newdata(X,Y) is greater than Thre[n-1][m] (S65: YES), then in S66 the CPU. 101 stores Outlevel[n-1][m] in the output dot combination Outlevel.

In S62 the CPU 101 calculates the difference between the corrected value Newdata(X,Y) and the relative density value Relative[n-1][m] for the output dot combination Outlevel[n-1][m], stores the calculated difference in the error ED(X,Y), and ends the threshold value process.

In this way, the corrected value Newdata(X,Y) is compared to threshold values beginning from the largest threshold and repeating with gradually decreasing thresholds until a threshold value corresponding to the corrected value Newdata(X,Y) is found.

If the process advances to S68, the CPU 101 determines whether the corrected value Newdata(X,Y) is greater than the threshold value Thre[1][m], which is the smallest threshold in the threshold table TH "m". If the Newdata(X,Y) is greater than Thre[1][m] (S68: YES), then in S69 the CPU 101 stores Outlevel[1][m] ((0, 0, 0, 0)) in the output dot combination Outlevel.

In S70 the CPU 101 calculates the difference between the corrected value Newdata(X,Y) and the relative density value Relative[1][m] for the output dot combination Outlevel[1][m], stores the calculated difference in the error ED(X,Y), and ends the threshold value process.

However, if the CPU 101 determines that the Newdata(X, Y) is not greater than the threshold value Thre[1][m] (S68: NO), then in S71 the CPU 101 stores zero in the output dot combination Outlevel.

In S72 the CPU 101 stores the corrected value Newdata(X, Y) in the error ED(X,Y), and ends the threshold value process.

Returning to the halftone process of FIG. 6, after completing the threshold value process of S31, in S32 the CPU 101 stores the output dot combination Outlevel in the output value Outdata(X,Y) for the subject pixel (X, Y).

In S33 the CPU 101 performs a dot placement process to allocate dots of the selected output dot combination in the four pixels (X−1, Y−1), (X, Y−1), (X−1, Y) and (X, Y) in the subject recording matrix.

Figure 9:
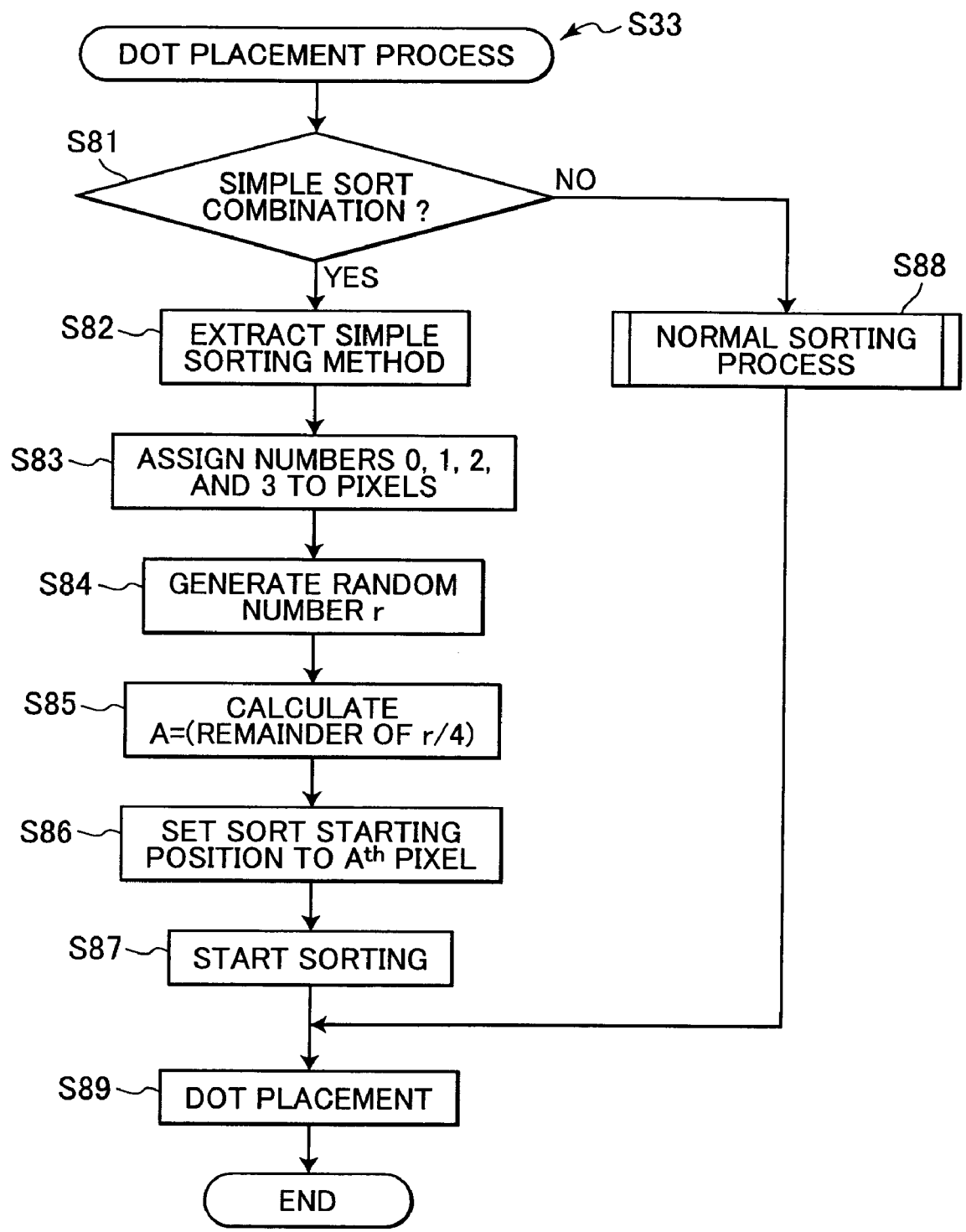
FIG. 9 is a flowchart showing steps in a dot placement process in FIG. 6.

The dot placement process is executed according to the steps shown in FIG. 9.

At the beginning of this process, the CPU 101 determines in S81 whether the output value Outdata(X,Y) (output dot combination) can be sorted or arranged using a simple sort. The CPU 101 makes this determination by referring to the threshold table TH "m" (FIG. 11) that has been used during the process of S31. More specifically, the CPU 101 determines the sort number that corresponds to the output dot combination that has been selected and that has been set in Outlevel in S31 (FIG. 6) and then that has been set in Outdata (X, Y) in S32 (FIG. 6). For example, if the output dot combination (0, small, medium, medium) has been selected and set in Outdata(X, Y) in S31 and set in Outdata(X, Y) in S32, the CPU 101 determines that the sort number is equal to "−1". The CPU 101 judges whether the determined sort number is positive or negative. If the determined sort number is positive, the CPU 101 determines to perform a simple sorting method onto the subject recording matrix. On the other hand, if the determined sort number is negative, the CPU 101 determines to perform another type of sorting method well known in the art, such as a bubble sort, heap sort, quick sort, or shell sort, onto the subject recording matrix.

It is noted that sort numbers function to differentiate different types of sorting methods as described below.

It is generally necessary to sort all the four input values in the subject recording matrix according to the sizes thereof when the selected output dot combination corresponds to a size relationship among the four input values. However, there are some cases in which it is unnecessary to sort all the four input values but it is sufficient to place one element. For example, when an output dot combination (0, 0, 0, small) has been selected for the subject recording matrix, it is sufficient to place one small dot in a pixel with the largest input value in the recording matrix. The process of S81 is executed as a branching process to determine a sorting method usable for the subject recording matrix in order to reduce the amount of calculations. The sort number of the positive value indicates that a corresponding output dot combination should be subjected to the simple sorting method. More specifically, the sort number of one (1) indicates that a corresponding output dot combination should be subjected to one type of simple sorting method for extracting one pixel having the maximum density among the four pixels in the subject recording matrix. The sort number of two (2) indicates that a corresponding output dot combination should be subjected to another type of simple sorting method for extracting two pixels having the maximum density among the four pixels in the subject recording matrix. The sort number of zero (0) indicates that a corresponding output dot combination should not be subjected to any sorting method. The sort number of the negative value indicates that a corresponding output dot combination should be subjected to the other type of sorting method.

When the sort number is positive and the CPU 101 determines that a simple sort can be performed on the output dot combination (S81: YES), then in S82 the CPU 101 extracts the sorting method determined for the sort number, and extracts either one or two pixels having the maximum density. More specifically, if the sort number is one (1), the CPU 101 extracts one pixel having the maximum density. If the sort number is two (2), the CPU 101 extracts two pixels having the maximum density.

In S83 the CPU 101 assigns numbers 0, 1, 2, and 3 to the four pixels in the subject recording matrix as shown in FIG. 12.

In S84 the CPU 101 generates a random number, and in S85 calculates a remainder A obtained by dividing the random number by four.

In S86 the CPU 101 sets a sort starting position to the $A^{th}$ pixel. For example, if the remainder obtained by dividing the random number by four is two, then the sort starting position is set to the second pixel.

In S87 the CPU 101 begins sorting according to the method selected in S82.

In S89 the CPU 101 places dots in pixels within the recording matrix based on the output value Outdata(X,Y) (output dot combination) and based on the extracted one or two pixel with the maximum density. More specifically, the extracted one or two pixels with the maximum density are placed with dots of the size that are indicated by the output dot combination, and no-dots are placed on the other remaining pixels. Subsequently, the CPU 101 ends the dot placement process.

However, if the CPU 101 determines in S81 that the output dot combination should not be sorted by a simple sort (S81: NO), then in S88 the CPU 101 performs a normal sorting process.

After completing this process, the CPU 101 advances to S89 and places dots in pixels within the recording matrix based on the output value Outdata(X,Y) and based on the sorted pixels. Subsequently, the CPU 101 ends the dot placement process.

Figure 10:
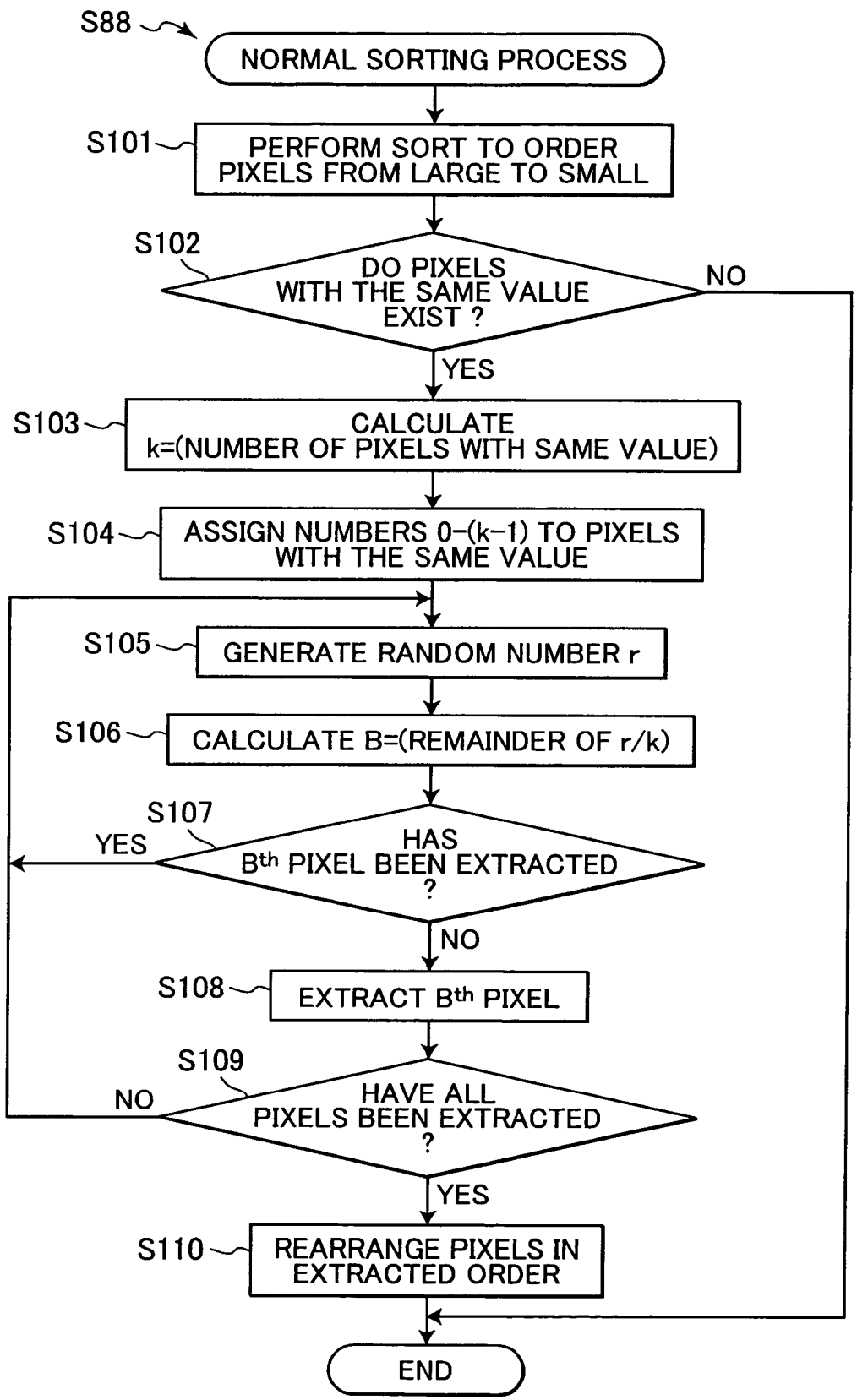
FIG. 10 is a flowchart showing steps in a normal sorting process according to the preferred embodiment.

The normal sorting process is executed according to the steps in FIG. 10.

At the beginning of this process, the CPU 101 performs a sort in S101 to arrange the pixels within the recording matrix in order from largest to smallest for the input values. The CPU 101 performs this sorting operation using a common sorting method well known in the art, such as the bubble sort, heap sort, quick sort, or shell sort, each of which is assigned a sort number in memory.

In S102 the CPU 101 determines whether any two or more pixels having the same density value exist within the subject recording matrix.

If the CPU 101 determines that there are pixels with the same density value (S102: YES), then in S103 the CPU 101 calculates a number k of pixels having the same density value.

In S104, the CPU 101 assigns integers from 0 to (k−1) to the pixels having the same density value. If there are three pixels having the same value, for example, then the numbers 0, 1, and 2 are assigned to these pixels.

In S105 the CPU 101 generates a random number.

In S106 the CPU 101 sets B to the remainder obtained by dividing the random number by k.

In S107 the CPU 101 determines whether the $B^{th}$ pixel has already been extracted.

If the CPU 101 determines that the $B^{th}$ pixel has not yet been extracted (S107: NO), then in S108 the CPU 101 extracts the $B^{th}$ pixel. For example, if k=3 and the remainder obtained by dividing the random number by three is two, then the CPU 101 extracts the second pixel.

However, if the CPU 101 determines in S107 that the $B^{th}$ pixel has already been extracted (S107: YES), then the CPU 101 returns to S105 and repeats the process as described above.

In S109 the CPU 101 determines whether all the pixels having the same density value have been extracted.

If the CPU 101 determines that all pixels with the same density value have not yet been extracted (S109: NO), then the CPU 101 returns to S105 and repeats the processes described above.

However, if the CPU 101 determines that all the pixels having the same density value have already been extracted (S109: YES), then in S110 the CPU 101 rearranges the pixels having the same density value in the extracted order and ends the normal sorting process.

However, if the CPU 101 determines in S102 that there are no pixels having the same density value (S102: NO), then the CPU 101 ends the normal sorting process.

Returning to the halftone process in FIG. 6, after completing the dot placement process in S33, the CPU 101 increments X in S34.

In S35, the CPU 101 determines whether the value of X is greater than X_SIZE.

If the CPU 101 determines that the value of X is less than or equal to X_SIZE (S35: NO), then the CPU 101 returns to S24 and repeats the processes described above.

However, if the CPU 101 determines that the value of X is greater than X_SIZE (S35: YES), then in S36 the CPU 101 sets X to zero and increments Y.

Next, the CPU 101 determines in S37 whether the value of Y is greater than Y_SIZE.

If the CPU 101 determines that the value of Y is less than or equal to Y_SIZE (S37: NO), then the CPU 101 returns to S24 and repeats the aforementioned processes.

However, if the CPU 101 determines that the value of Y is greater than Y_SIZE (S37: YES), then the CPU 101 ends the halftone process.

On the other hand, if the CPU 101 determines in S22 that the flag Fy is set (S22: YES), then in S38 the CPU 101 performs a dither process. This process renders the gradation of yellow pixel data by the distribution of dots according to a dither method.

More specifically, as shown in FIG. 13, the entire X_SIZE× Y_SIZE number of input image data is divided into matrices, each matrix being made up of A×B pixels, (wherein A and B are integers greater than two) and a process is performed for each matrix. A threshold matrix has the A×B cells, and has three threshold values in each cell. Each input value in the subject matrix is compared with the corresponding three threshold values in the threshold matrix, and an output value (0, 1, 2, or 3) is determined based on the compared result. The output value (0) indicates output of no dot, the output value (1) indicates output of a small dot, the output value (2) indicates output of a medium dot, and the output value (3) indicates output of a large dot. The dither method is a well-known technique and, hence, a detailed description of this method has been omitted. After the dither process has been completed, the CPU 101 ends the halftone process.

As described above, the halftone-image processing device 100 of the present embodiment divides all the pixels for input image data into a plurality of 2×2 recording matrices and performs a process on each of the recording matrices. The halftone-image processing device 100 stores the plurality of threshold tables TH, each being indicative of a one-to-one correspondence between a plurality of threshold values and a plurality of output dot combinations of large, medium, and small output dots. The halftone-image processing device 100 calculates the sum of density values for all the pixels in a recording matrix, compares the sum of density values to the threshold values in the threshold table TH, and determines an output dot combination for the subject recording matrix based on the compared results. The halftone-image processing device 100 sets the placement of output dots for pixels of the recording matrix based on: the determined output dot combination, the magnitude of the density values for the pixels in the recording matrix, and, when more than one pixel in the recording matrix has the same density value, a random number.

As described above, the personal computer 100 calculates the sum Sum(X,Y) of density values for all pixels in the recording matrix in the process of S28 in FIG. 6, and further calculates the corrected value Newdata(X,Y) according to the processes of S29 and S30 in FIG. 6. In S31 of FIG. 6, the personal computer 100 determines an output dot combination Outlevel based on the threshold table TH by comparing the corrected value Newdata(X,Y) to the threshold value Thre[N][M]. In S33 of FIG. 6 dots are outputted with priority given to pixels having the largest density values. When pixels have the same density value, a random number is used to determine the pixels for which dots are outputted.

Accordingly, pixels in the recording matrix for which dots are outputted vary irregularly. Hence, if the input image data includes a continuous region having little change in density, the output image data generated will not include consecutive recording matrices having the same output dot placement. In other words, the halftone-image processing device 100 of the present embodiment can produce output image data that does not contain cyclic patterns. Upon receipt of the output image data (S12 in FIG. 5), the inkjet printer 200 can form an image without cyclic patterns.

Further, since dots are outputted with priority given to pixels having larger density values, it is possible to prevent a condition in which dots are not outputted for pixels having large density values, thereby producing output image data that accurately reproduces the light and dark shades of the input image data.

In S31 of FIG. 6, the personal computer 100 can determine various output dot combinations Outlevel corresponding to the corrected value Newdata(X,Y). Accordingly, pixels for which dots are outputted can be varied according to the corrected value Newdata(X,Y), thereby producing output image data that accurately reproduces the input image data.

In S128 of FIG. 14 the personal computer 100 selects a threshold table TH based on printing conditions and determines an output dot combination Outlevel based on this threshold table TH. Accordingly, the personal computer 100 can select the optimal threshold table TH for printing conditions and can generate optimal output image data for the printing conditions.

In S123 of FIG. 14, the personal computer 100 selects a threshold table TH according to user operations and sets the output dot combination Outlevel based on this threshold table TH. Accordingly, when printing characteristics of the image-forming device degrade through continuous use, the personal computer 100 can compensate for these changes in printing characteristics based on the user's judgment and can generate optimal output image data.

In S125 of FIG. 14, the personal computer 100 can set any threshold value in the threshold table TH and any output dot combination Outlevel based on operations by the user. Accordingly, the user can set a threshold value and output dot combination Outlevel for generating appropriate output image data and can exclude settings that generate undesirable output image data, thereby producing suitable output image data based on the user's judgment.

In S29 and S30 of FIG. 6, the personal computer 100 collects errors ED(X,Y) according to the distribution matrix mtr(X,Y) and adds the collected errors (correction amount) to the sum value Sum(X,Y) into a corrected value Newdata(X, Y). In S31 of FIG. 6 the personal computer 100 compares the corrected value Newdata(X,Y) to a threshold value and determine an output dot combination Outlevel based on the results of this comparison.

In this way, the personal computer 100 corrects the sum value Sum(X,Y) for the subject recording matrix based on errors generated on the already-processed neighboring recording matrices. The personal computer 100 can reduce the difference in density between the input image data and output image data for the overall image data.

In S22 of FIG. 6 the personal computer 100 performs the process in S38 of FIG. 6 (process shown in FIG. 13) when the yellow flag Fy has been set and performs the process in S23-S37 of FIG. 6 when the yellow flag Fy has not been set.

The processing speed in the halftone process can be improved by performing a simple determination as to whether or not the ink color is yellow and by performing a high-speed dither process onto yellow pixel data. This is because cyclic patterns in yellow ink do not stand out.

In S31 of FIG. 6 the personal computer 100 compares the corrected value Newdata(X,Y) to the threshold value Thre[N][M] and determines the output dot combination Outlevel based on the threshold table TH. In S33 of FIG. 6 the personal computer 100 sets pixels in the recording matrix for which dots are to be outputted and sets the dot diameter based on the number of dots to be outputted for each dot diameter.

Since output dots having different dot diameters can be determined based on the density values of the pixels, the personal computer 100 can generate output image data capable of reproducing the input image data accurately.

In the embodiment described above, the threshold tables TH do not include the combination (small, small, small, small). Accordingly, the personal computer 100 never determines to output small dots for all the four pixels in the recording matrix. The personal computer 100 suppresses the occurrence of banding by never generating output image data that outputs small dots for all pixels in a recording matrix.

It is noted that banding tends to occur when small dots are outputted for all pixels in a recording matrix. More specifically, in a printer, such as an inkjet printer, that can output large, medium, and small dots, dot ejection becomes unstable when forming images by ejecting small dots consecutively. This leads to the problem called banding in which white lines can be seen within the image.

Dot density decreases in low-resolution image formation, for example. Accordingly, white regions are always generated even when densely ejecting small dots. Further, the impact positions of ink ejected from nozzles deviates slightly from the ideal positions. Accordingly, the uniformity of white regions between dots is lost even when forming images with dense small dots. These irregular white regions appear as banding after image formation.

According to the present embodiment, the personal computer 100 suppresses the occurrence of banding by never generating output image data that outputs small dots for all pixels in a recording matrix.

It is noted that in addition to the combination (small, small, small, small), the combinations (medium, medium, medium, medium) and (large, large, large, large) may also be excluded from the threshold tables TH.

In high-resolution image formation, dot density increases and therefore white areas between dots decrease. Accordingly, banding may not be detected even when forming small dots densely. In this way, the occurrence of banding depends on the combination of resolution and dot diameter. The banding can possibly occur even with large and medium dots depending on the resolution. Accordingly, the personal computer 100 can suppress the occurrence of banding by never generating output image data that outputs medium dots for all pixels in a recording matrix or output image data that outputs large dots for all pixels in a recording matrix. The personal computer 100 can suppress the occurrence of banding by never generating output image data that outputs small dots for all pixels in a recording matrix, output image data that outputs medium dots for all pixels in a recording matrix, and output image data that outputs large dots for all pixels in a recording matrix.

Modification

In the above-described embodiment, the dot placement process of S33 (FIG. 6) is configured of the steps in FIG. 9. However, the dot placement process of S33 may instead be configured of the steps shown in FIG. 16.

Figure 16:
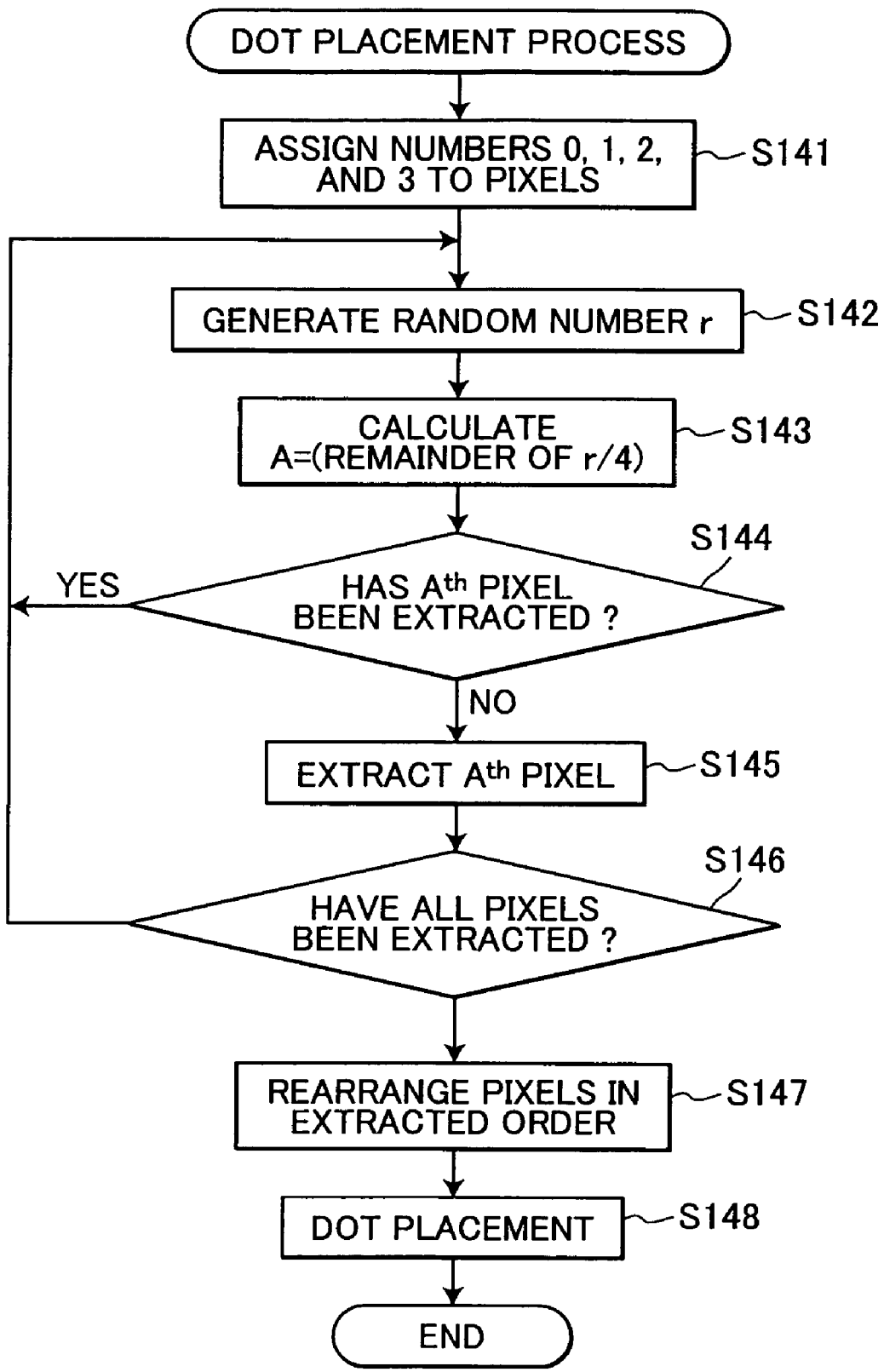
FIG. 16 is a flowchart showing steps in the dot placement process according to a modification of the first embodiment.

FIG. 16 is a flowchart showing steps in the dot placement process according to this modification of the embodiment.

At the beginning of the dot placement process, in S141 the CPU 101 assigns the numbers 0, 1, 2, and 3 to all the four pixels existing in the subject recording matrix as shown in FIG. 12.

In S142 the CPU 101 generates a random number. In S143 the CPU 101 sets A to the remainder obtained by dividing the random number by four.

In S144 the CPU 101 determines whether the $A^{th}$ pixel has already been extracted.

If the CPU 101 determines that the $A^{th}$ pixel has not yet been extracted (S144: NO), then in S145 the CPU 101 extracts the $A^{th}$ pixel.

However, if the CPU 101 determines that the $A^{th}$ pixel has already been extracted (S144: YES), then the CPU 101 returns to S142 and repeats the process described above.

In S146 the CPU 101 determines whether all the four pixels within the subject recording matrix have been extracted. If the CPU 101 determines that all the pixels have not yet been extracted (S146: NO), then the CPU 101 returns to S142 and repeats the processes described above.

However, if the CPU 101 determines that all the pixels within the subject recording matrix have been extracted (S146:YES), then in S147 the CPU 101 arranges all the pixels in their extracted order in the subject recording matrix.

In S148 the CPU 101 places dots or non-dots in the thus sorted pixels based on the output value Outdata(X,Y).

Subsequently, the CPU 101 ends the dot placement process.

In S141-S148, a random number is used to set pixels, for which dots are to be outputted, according to the output value Outdata(X,Y). Accordingly, pixels in the recording matrix for which dots are to be outputted vary irregularly. Therefore, the halftone-image processing device 100 of the present modification does not generate output image data having consecutive recording matrices with the same output dot arrangement, even when the input image data includes continuous regions having very little change in density. Hence, it is possible to produce output image data without cyclic patterns.

Second Embodiment

Next, a second embodiment of the present invention will be described while referring to the drawings.

First, the construction of an inkjet printer 200 according to the second embodiment will be described with reference to FIG. 17.

Figure 17:
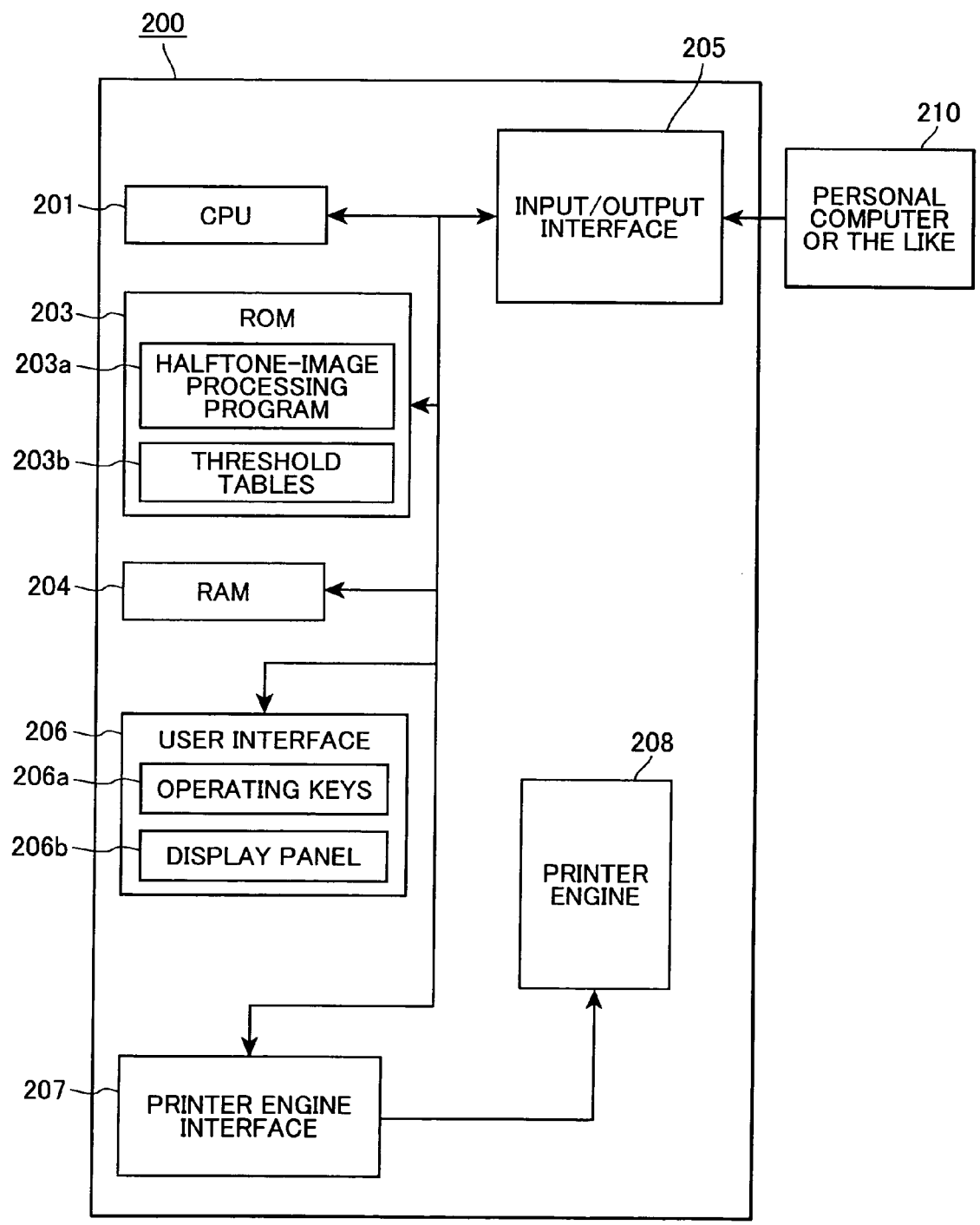
FIG. 17 is a block diagram showing the construction of an inkjet printer according to a second embodiment of the present invention.

As shown in FIG. 17, the inkjet printer 200 includes a CPU 201 that executes processes based on prescribed programs, a ROM 203 prestored with various control programs, a RAM 204 provided with various memory spaces for storing data and the like inputted from external devices, an input/output interface 205, a user interface 206 including a plurality of operating keys 206a that can be operated by the user and a display panel 206b for displaying various data, a printer engine interface 207, and a printer engine 208.

The ROM 203 has a program storage area 203a prestored with the halftone-image processing program (FIGS. 5-8, FIGS. 9 and 10 (or FIG. 16), and FIG. 14) that enables the CPU 201 to execute a halftone image process, and a threshold table storage area 203b that stores therein the plurality of threshold tables TH (FIG. 11) used in the halftone image process.

The input/output interface 205 is connected to each of the components 201, 203, 204, 206, and 207 and to a personal computer 210 or other external device that inputs image data into the inkjet printer 200.

The printer engine 208 includes ink nozzles for each of the colors yellow, magenta, cyan, and black; a print head capable of printing large, medium, and small dots; and ink cartridges for the colors yellow, magenta, cyan, and black. The printer engine 208 can form color images on a print medium by ejecting ink downward.

In the above-described first embodiment, the CPU 101 in the personal computer 100 executes the processes such as the printing process (FIG. 5) and the halftone image process (FIG. 6). However, according to the present embodiment, the CPU 201 in the inkjet printer 200 executes these processes. It is noted that in S12 of FIG. 5, the CPU 201 outputs the processed image data to the printer engine 208. Since the methods for performing the printing process, halftone image process, and the like according to the present embodiment are identical to those described in the first embodiment, a description of these processes has been omitted.

As in the first embodiment, the inkjet printer 200 of the second embodiment having the construction described above can generate output image data and can form images using the generated output image data. Therefore, the inkjet printer 200 can form images without undesired cyclic patterns.

While the invention has been described in detail with reference to the specific embodiments thereof, it would be apparent to those skilled in the art that various changes and modifications may be made therein without departing from the spirit of the invention.

For example, the above-described second embodiment is related to the inkjet printer 200. However, the present invention can be applied to a copy machine, facsimile machine, or the like having an image forming function.

In the above-described embodiments, a sum of the density values of all the pixels in the recording matrix is used as a representative density value that represents the density values of the pixels. However, an average of density values for all the pixels in the recording matrix can be used to represent the density values of the pixels.

In the embodiments described above, large, medium, and small dots are described as the types of output dots. However, the present invention can also be applied to other devices having more than three types of output dots or having only two types of output dots.

The present invention can also be applied to a device having only one type of output dot. In this case, each threshold table TH may be configured of threshold values and the number of output dots in one-to-one correspondence with each other. The present invention can be applied to a printer that outputs only one type of dot, such as a laser printer.

In the above-described embodiments, the halftone process is performed on 2×2 recording matrices. However, the process may be performed on larger recording matrices, such as 4×4 or 8×8 recording matrices.

In the above-described embodiments, when image data to be processed is for yellow ink (yes in S22), the dither process is executed onto the image data for yellow ink in S38. When image data to be processed is not for yellow ink (no in S22), the halftone process of S23-S37 is executed onto the image data not for yellow ink. However, the process of S22 may be modified to judge whether or not image data to be processed is for ink whose hue characteristic is similar to yellow hue characteristic. If image data to be processed is for ink whose hue characteristic is similar to yellow hue characteristic (yes in S22), the dither process is executed onto the subject image data in S38. If image data to be processed is not for ink whose hue characteristic is similar to yellow hue characteristic (no in S22), the halftone process of S23-S37 is executed onto the subject image data. This is because when ink has hue characteristics similar to yellow, cyclic patterns in the subject ink do not stand out.

The halftone-image processing program may be originally recorded in a recording medium such as a flexible disk, a CD-ROM, or the like, and be supplied to a user, who then loads the program to his/her own personal computer or printer. Or, the halftone-image processing program may be supplied from the communication network such as the Internet to the user, who then loads the program to his/her own personal computer or printer.

The halftone-image processing program may be supplied to: computer systems that are built in halftone-image processing devices, computer systems that are built in image-forming devices, and computer systems that are connected to and that are capable of performing data communications with halftone-image processing devices and/or image-forming devices through wired or wireless communication lines.

What is claimed is:

1. A halftone-image processing device, comprising:
    an input portion that receives input image data for a plurality of pixels, the input image data including data indicative of a density value for each pixel, the plurality of pixels being grouped into a plurality of recording matrices, each recording matrix being formed of a prescribed number of pixels which are located adjacent to one another;
    a representative density calculating portion that calculates, based on the density values for the pixels located in one recording matrix, a representative density value that represents the densities of the pixels located in the subject recording matrix;
    a storage portion that stores a threshold table indicating a correspondence between a threshold value and an output dot number;
    a comparing portion that compares the representative density value calculated for the subject recording matrix to the threshold value in the threshold table and that determines an output dot number for the representative density value based on the compared result; and
    a dot-forming pixel determining portion that uses a random number to determine, based on the determined output dot number, pixels for which output dots are to be outputted among the pixels in the subject recording matrix to configure a half-tone output image, thereby generating output image data.

2. A halftone-image processing device according to claim 1, wherein the dot-forming pixel determining portion judges whether or not the density values for at least two pixels in the subject recording matrix are equal to each other, the dot-forming pixel determining portion using, when the density values for the at least two pixels in the subject recording matrix are equal to each other, the random number to determine whether or not output dots are to be outputted for the at least two pixels.

3. A halftone-image processing device according to claim 1, wherein the dot-forming pixel determining portion uses the random number to allocate the output dots of the determined output dot number among the pixels in the subject recording matrix.

4. A halftone-image processing device according to claim 1, wherein the dot-forming pixel determining portion gives priority to a pixel having a larger density value than another pixel to determine pixels in the recording matrix for which output dots are to be outputted, the dot-forming pixel determining portion using the random number to determine pixels for which output dots are to be outputted when at least two of the pixels in the recording matrix have the same density value.

5. A halftone-image processing device according to claim 1, wherein the threshold table indicates a one-to-one correspondence between a plurality of threshold values and a plurality of output dot numbers; and
    the comparing portion compares the representative density value for the subject recording matrix to the plurality of threshold values to select one output dot number that corresponds to the representative density value.

6. A halftone-image processing device according to claim 5, wherein the storage portion is prestored with a plurality of different threshold tables, each threshold table indicating a one-to-one correspondence between a plurality of threshold values and a plurality of output dot numbers,
    further comprising a selecting portion that selects one of the plurality of threshold tables;
    wherein the comparing portion compares the representative density value for the subject recording matrix to the plurality of threshold values in the selected threshold table to determine the output dot number for the subject recording matrix.

7. A halftone-image processing device according to claim 6, wherein the selecting portion selects one of the plurality of threshold tables based on printing conditions.

8. A halftone-image processing device according to claim 6, further comprising a selection inputting portion that enables a user to input a selection instruction to select one threshold table among the plurality of threshold tables and selection data indicating the one threshold table,
    wherein the selecting portion selects the threshold table based on the selection data upon receipt of the selection instruction.

9. A halftone-image processing device according to claim 1, further comprising a setting portion that sets a threshold table indicative of correspondence between an arbitrary threshold value and an arbitrary output dot number, the storage portion storing the set threshold value.

10. A halftone-image processing device according to claim 9, further comprising a settings inputting portion that enables a user to indicate his/her desire to set his/her desired threshold table and to input settings data indicative of at least one of a threshold value and an output dot number configuring his/her desired threshold table, and
    wherein the setting portion sets his/her desired threshold table based on the inputted settings data.

11. A halftone-image processing device according to claim 1, further comprising:
- an error detection portion that detects, as an error, a difference between the representative density value for the subject recording matrix and an output dot density value that corresponds to the determined output dot number; and
- a storing portion that stores the error determined for the subject recording matrix.

12. A halftone-image processing device according to claim 11, further comprising a correcting portion that corrects the representative density value for the subject recording matrix based on an error stored in the storage portion for at least one adjacent recording matrix, which is positioned adjacent to the subject recording matrix and for which the error has been detected,
- wherein the comparing portion compares the corrected representative density value to the threshold value and determines the output dot number based on the result of the comparison.

13. A halftone-image processing device according to claim 1, further comprising:
- a first halftone processing portion that controls the representative density calculating portion, the comparing portion, and the dot-forming pixel determining portion to perform the halftone image process onto the input image data;
- a second halftone processing portion that performs a halftone image process onto the input image data by using a dither matrix to determine pixels in the recording matrix for which output dots are to be outputted; and
- a determining portion that determines which one of the first halftone processing portion and the second halftone processing portion is to be executed for the input image data, that actuates the first halftone processing portion while prohibiting actuation of the second halftone processing portion when determining the first halftone processing portion to be executed, and that actuates the second halftone processing portion while prohibiting actuation of the first halftone processing portion when determining the second halftone processing portion to be executed.

14. A halftone-image processing device according to claim 13, wherein the determining portion determines whether or not the input image data includes density data for color whose hue is substantially the same as yellow hue, the determining portion actuating the second halftone processing portion while prohibiting actuation of the first halftone processing portion when determining that the input image data includes density data for color whose hue is substantially the same as yellow hue and actuating the first halftone processing portion while prohibiting actuation of the second halftone processing portion when determining that the input image data includes no density data for the color whose hue is substantially the same as yellow hue.

15. A halftone-image processing device according to claim 1, wherein the output dots include a plurality of different types of dots having different dot diameters,
- wherein the threshold table indicates correspondence between the threshold value and an output dot number for each of type of dot,
- wherein the comparing portion compares the representative density value for the subject recording matrix to the threshold value and determines the output dot number for each type of dot based on the compared result, and
- wherein the dot-forming pixel determining portion determines, according to the determined output dot number for each type of dot, pixels in the subject recording matrix for which dots are to be formed and the types of the dots to be formed.

16. A halftone-image processing device according to claim 15, wherein the threshold table includes, in correspondence with the threshold value, dot-combination information indicating whether or not a dot is to be formed for each pixel in a recording matrix and the type of dot to be formed in the pixel for which the dot is to be formed, the dot-combination information including information preventing dots of the same dot diameter from being formed for all the pixels in the recording matrix.

17. A halftone-image processing device according to claim 16, wherein the output dots include a plurality of different types of dots having a plurality of different dot diameters, which include the smallest dot diameter and at least one remaining dot diameter that is greater than the smallest dot diameter, the dot-combination information including information preventing dots of the smallest dot diameter from being formed for all the pixels in the recording matrix.

18. A halftone-image processing device according to claim 1, further comprising an image forming portion that forms a halftone output image based on the output image data.

19. A halftone-image processing device according to claim 15, further comprising an image forming portion that forms a halftone output image based on the output image data, the image forming portion including an ink jet printing portion that outputs ink droplets of a plurality of different sizes that correspond to the plurality of different dot diameters.

20. A halftone-image processing device, comprising:
- an input portion that receives input image data for a plurality of pixels, the input image data including data indicative of a density value for each pixel, the plurality of pixels being grouped into a plurality of recording matrices, each recording matrix being formed of a prescribed number of pixels which are located adjacent to one another;
- a representative density calculating portion that calculates, based on the density values for the pixels located in one recording matrix, a representative density value that represents the densities of the pixels located in the subject recording matrix;
- a storage portion that stores a threshold table indicating a correspondence between a threshold value and an output dot number;
- a comparing portion that compares the representative density value calculated for the subject recording matrix to the threshold value in the threshold table and that determines an output dot number for the representative density value based on the compared result; and
- a dot-forming pixel determining portion that selectively uses a random number to determine, based on the determined output dot number, pixels for which output dots are to be outputted among the pixels in the subject recording matrix to configure a half-tone output image, thereby generating output image data.

21. A halftone-image processing device according to claim 20, wherein the dot-forming pixel determining portion determines pixels for which output dots are to be outputted based on the determined output dot combination, the magnitude of the density values for the pixels in the recording matrix, and, when more than one pixel in the recording matrix has the same density value, a random number.

22. A halftone-image processing device according to claim 21, wherein the dot-forming pixel determining portion determines pixels for which output dots are to be outputted by giving priority to a pixel having a larger density value than another pixel, and uses a random number when at least two of the pixels in the recording matrix have the same density value.

23. A halftone-image processing device, comprising:

input means for receiving input image data for a plurality of pixels, the input image data including data indicative of a density value for each pixel, the plurality of pixels being grouped into a plurality of recording matrices, each recording matrix being formed of a prescribed number of pixels which are located adjacent to one another;

representative density calculating means for calculating, based on the density values for the pixels located in one recording matrix, a representative density value that represents the densities of the pixels located in the subject recording matrix;

a storage portion storing a threshold table indicating a correspondence between a threshold value and an output dot number;

comparing means for comparing the representative density value calculated for the subject recording matrix to the threshold value in the threshold table and for determining an output dot number for the representative density value based on the compared result; and dot-forming pixel determining means for using a random number to determine, based on the determined output dot number, pixels for which output dots are to be outputted among the pixels in the subject recording matrix to configure a half-tone output image, thereby generating output image data.

24. A halftone-image processing method, comprising the steps of:

receiving input image data for a plurality of pixels, the input image data including data indicative of a density value for each pixel, the plurality of pixels being grouped into a plurality of recording matrices, each recording matrix being formed of a prescribed number of pixels which are located adjacent to one another;

calculating, based on the density values for the pixels located in one recording matrix, a representative density value that represents the densities of the pixels located in the subject recording matrix;

comparing the representative density value calculated for the subject recording matrix to a threshold value in a threshold table, which indicates a correspondence between the threshold value and an output dot number, and determining an output dot number for the representative density value based on the compared result; and using a random number to determine, based on the determined output dot number, pixels for which output dots are to be outputted among the pixels in the subject recording matrix to configure a half-tone output image, thereby generating output image data.

25. A computer-readable storage medium storing a halftone-image processing program executable by a computer, the halftone-image processing program comprising:

instructions for receiving input image data for a plurality of pixels, the input image data including data indicative of a density value for each pixel, the plurality of pixels being grouped into a plurality of recording matrices, each recording matrix being formed of a prescribed number of pixels which are located adjacent to one another;

instructions for calculating, based on the density values for the pixels located in one recording matrix, a representative density value that represents the densities of the pixels located in the subject recording matrix;

instructions for comparing the representative density value calculated for the subject recording matrix to a threshold value in a threshold table, which indicates a correspondence between the threshold value and an output dot number, and determining an output dot number for the representative density value based on the compared result; and instructions for using a random number to determine, based on the determined output dot number, pixels for which output dots are to be outputted among the pixels in the subject recording matrix to configure a half-tone output image, thereby generating output image data.

* * * * *